US009691219B1

(12) United States Patent
Froy et al.

(10) Patent No.: US 9,691,219 B1
(45) Date of Patent: Jun. 27, 2017

(54) ENHANCED ELECTRONIC GAMING MACHINE WITH ELECTRONIC MAZE AND EYE GAZE DISPLAY

(71) Applicant: IGT CANADA SOLUTIONS ULC, Moncton (CA)

(72) Inventors: David Froy, Lakeville-Westmorland, CA (US); Christopher Spurrell, Boundary Creek, CA (US)

(73) Assignee: IGT CANADA SOLUTIONS ULC, Moncton (CA)

( * ) Notice: Subject to any disclaimer, the term of this patent is extended or adjusted under 35 U.S.C. 154(b) by 0 days.

(21) Appl. No.: 14/966,696

(22) Filed: Dec. 11, 2015

(51) Int. Cl.
*A63F 13/00* (2014.01)
*G07F 17/32* (2006.01)

(52) U.S. Cl.
CPC ...... *G07F 17/3225* (2013.01); *G07F 17/3211* (2013.01); *G07F 17/3244* (2013.01); *G07F 17/3206* (2013.01)

(58) Field of Classification Search
None
See application file for complete search history.

(56) References Cited

U.S. PATENT DOCUMENTS 6,222,465 B1 4/2001 Kumar et al.
7,815,507 B2 10/2010 Parrott et al.
2011/0304606 A1* 12/2011 Walsh .................... G06F 3/013 345/214
2012/0105486 A1* 5/2012 Lankford ................ G06F 3/013 345/661
2012/0256967 A1* 10/2012 Baldwin ................. G06F 3/013 345/684
2012/0322542 A1* 12/2012 Chudd ................ G07F 17/3206 463/25
2013/0267317 A1* 10/2013 Aoki .................. G07F 17/3206 463/32
2014/0292665 A1* 10/2014 Lathrop .................. G06F 3/013 345/173
2014/0323194 A1* 10/2014 Keilwert ............. G07F 17/3206 463/16
2015/0169053 A1* 6/2015 Bozarth ............. G06K 9/00604 345/156
2016/0093136 A1* 3/2016 Lyons ................. G07F 17/3206 463/21
2016/0252957 A1* 9/2016 Raux ....................... G06F 3/013

* cited by examiner

*Primary Examiner* — Jason Yen
(74) *Attorney, Agent, or Firm* — Sage Patent Group

(57) ABSTRACT

An enhanced electronic gaming machine is provided, the electronic gaming machine adapted for generating an interactive game environment having graphical game components for at least an interactive network of intercommunicating paths and an electronic player token; a game controller for detecting a plurality of points of eye gaze of the player relative to the displayed graphical game components for the interactive network of intercommunicating paths; the game controller mapping the plurality of points of eye gaze of the player to the interactive network of intercommunicating paths and triggering a graphical animation representative of movement of the electronic player token based on a player pathway generated at least based on the plurality of points of eye gaze.

20 Claims, 19 Drawing Sheets

610

620

ENHANCED ELECTRONIC GAMING MACHINE WITH ELECTRONIC MAZE AND EYE GAZE DISPLAY

FIELD

Embodiments described herein relate to the field of electronic gaming systems, and more specifically to manipulating game components or interface in response to a player's eye movements and/or gaze positions.

INTRODUCTION

Casinos and other establishments may have video gaming terminals that may include game machines, online gaming systems (that enable users to play games using computer devices, whether desktop computers, laptops, tablet computers or smart phones), computer programs for use on a computer device (including desktop computer, laptops, tablet computers or smart phones), or gaming consoles that are connectable to a display such as a television or computer screen.

Video gaming terminals may be configured to enable users to play games with a touch interface. Example games may be a slot machine game, which may involve a reel of symbols that may move by pulling a lever to activate the reel of symbols. A user may win a prize based on the symbols displayed on the reel. In addition to slot machine games, video gaming machines may be configured to enable users to play a variety of different types of games. To interact with a game component of the game, the user may have to press a button that is part of the machine hardware, or the user may have to touch a button displayed on a display screen.

The size of a video gaming terminal may be limited by its hardware, which may limit the amount of and types of physical interactions that a user may engage in with the machine to play the game. A user may want to have different experiences while playing at the same video gaming terminal. However, since a video game terminal and its associated hardware have finite size, there may be a limit on the number of buttons or physical elements on the gaming terminal. For example, a display screen of a gaming terminal has a finite size, so a limited number of game components, buttons, or interfaces may be displayed.

It may be desirable to immerse the user in their gaming experience while at the same video gaming terminal and making more efficient use of the physical limitations of the hardware of the video gaming terminal. Therefore it is necessary to innovate by launching new and engaging game machines with innovative hardware where the player can interact with the interactive game using their eye gaze.

SUMMARY

In accordance with an aspect, there is provided an electronic gaming machine comprising: at least one data storage unit to store game data for a game, the game data comprising at least one game condition and an interactive network of intercommunicating paths, the at least one game condition being associated with traversal of the interactive network of intercommunicating paths; a graphics processor to generate an interactive game environment, wherein the interactive game environment provides graphical game components for the interactive network of intercommunicating paths and an electronic player token; a display unit to display, via a graphical user interface, the graphical game components in accordance with the game data to graphically display the interactive network of intercommunicating paths; a data capture camera unit to collect player eye gaze data; a game controller for detecting a plurality of points of eye gaze of the player relative to the displayed graphical game components for the interactive network of intercommunicating paths using the collected player eye gaze data; and continuously computing a player pathway based on the plurality of points of eye gaze to generate a graphical animation for the electronic player token relative to the graphical game components for the interactive network of intercommunicating paths; and a display controller to control the display unit, via the graphical user interface, to trigger the graphical animation for the electronic player token representative of movement of the electronic player token as a mapping of the player pathway to the interactive network of intercommunicating paths, and to determine whether the at least one game condition has been satisfied to trigger an award notification.

In accordance with another aspect, the player pathway is computed based at least on a plurality of predicted points of eye gaze.

In accordance with another aspect, the plurality of predicted points of eye gaze are predicted through using at least prior player data of one or more other players.

In accordance with another aspect, the interactive network of intercommunicating paths includes one or more award positions, which when traversed upon by the electronic player token, causes provisioning of one or more awards that cause at least one of the at least one game condition to be satisfied.

In accordance with another aspect, the graphical game components graphically displaying of the interactive network of intercommunicating paths are configured to graphically display a concealment layer, the concealment layer concealing at least a portion of the interactive network of intercommunicating paths.

In accordance with another aspect, the concealment layer utilizes at least one of covering, blurring, mosaicking, and pixelization techniques for concealing the at least a portion of the interactive network of intercommunicating paths.

In accordance with another aspect, the concealment layer is graphically removed across one or more graphical areas in response to the position of the electronic player token mapped of the player pathway to the interactive network of intercommunicating paths.

In accordance with another aspect, the concealment layer is graphically removed at positions derived at least from the plurality of points of eye gaze of the player.

In accordance with another aspect, the provided electronic gaming machine further comprises a wagering component configured for tracking one or more wagers that is placed in relation to the satisfaction or a failure of at least one game condition, and upon a determination that the at least one game condition has been satisfied or failed, to cause the electronic gaming machine to provide one or more payouts or to collect one or more payments, each one of the one or more payouts and each one of the one or more payments corresponding to one of the one or more wagers.

In accordance with another aspect, the interactive network of intercommunicating paths is provided as a multi-dimensional maze having one or more interactive planes representative of separate interactive networks of intercommunicating paths, and wherein the electronic player token is adapted for traversing between interactive planes of the one or more interactive planes through one or more linkages established between the one or more interactive planes.

In accordance with another aspect, the multi-dimensional maze is a three dimensional cube.

In accordance with another aspect, the multi-dimensional maze is a three dimensional sphere.

In accordance with another aspect, the multi-dimensional maze is configured for rotation in response to the electronic player token reaching an edge of one of the one or more interactive planes, and wherein rotation of the multi-dimensional maze causes exposure of at least another interactive plane of the one or more planes.

In accordance with another aspect, upon rotation of the multi-dimensional maze, the electronic player token is graphically repositioned on at least one of the interactive planes of the one or more planes that is exposed by the rotation of the multi-dimensional maze.

In accordance with another aspect, the data capture camera unit is configured to collect player eye gaze data of a second player; the game controller is further configured for detecting a plurality of points of eye gaze of the second player relative to the displayed graphical game components for the interactive network of intercommunicating paths using the collected player eye gaze data; and continuously computing a second player pathway based on the plurality of points of eye gaze of the second player to generate a second graphical animation for a second electronic player token relative to the graphical game components for the interactive network of intercommunicating paths; and the display controller is configured to control the display, via the graphical user interface, to trigger the second graphical animation for the second electronic player token representative of movement of the second electronic player token as a mapping of the second player pathway to the interactive network of intercommunicating paths.

In accordance with another aspect, the at least one game condition is associated with traversal of the interactive network of intercommunicating paths by both the first electronic player token and the second electronic player token.

In accordance with another aspect, the at least one game condition includes at least one cooperative game condition requiring the satisfaction of the game condition by both the first electronic player token and the second electronic player token.

In accordance with another aspect, the at least one game condition includes at least one competitive game condition requiring the satisfaction of the game condition by one of the first electronic player token and the second electronic player token.

In accordance with another aspect, the player pathway is computed based on the plurality of points of eye gaze by determining a start position and an end position for the points of eye gaze across a duration of time, and the game controller determining that the start position is a current position of the electronic player token, and the end position is a valid position within the interactive network of intercommunicating paths in which the electronic player token is capable of moving to.

In accordance with another aspect, the player pathway is computed based on determining that the plurality of points of eye gaze are indicative of a direction in which the electronic player token is capable of making a valid move in within the interactive network of intercommunicating paths, and the player pathway includes establishing, by the game controller, a pathway in which the electronic player token moves in the direction indicated by the plurality of points of eye gaze.

In some embodiments, the display controller controls the display device to display a plurality of calibration symbols, wherein the at least one data capture camera device monitors the eye gaze of the player in relation to the calibration symbols to collect calibration data, and wherein the game controller calibrates the at least one data capture camera device and the display device based on the calibration data.

In some embodiments, the player eye gaze data comprises a position and a focus, the position defined as coordinates of the player's eyes relative to the display device, the focus defined as a line of sight relative to the display device.

In some embodiments, the game controller determines the location of the eye gaze of the player relative to the viewing area by identifying coordinates on the display device corresponding to the player eye gaze data and mapping the coordinates to the viewing area.

In some embodiments, the game controller defines a filter movement threshold, wherein the game controller, prior to determining the location of the eye gaze of the player relative to the viewing area and triggering the control command to the display controller to dynamically update the rendering of the viewing area, determines that the player eye gaze meets the filter movement threshold.

In some embodiments, the game controller predicts the location of the eye gaze of the player relative to the viewing area at a future time using the player eye gaze data to facilitate dynamic update to the rendering of the viewing area.

In some embodiments, the at least one data capture camera unit continuously monitors an area proximate to the electronic gaming machine to collect proximity data, wherein the game controller detects a location of the player relative to the electronic gaming machine based on the proximity data, and triggers the display controller to display an advertisement on the display device.

In some embodiments, the display controller renders a gaze-sensitive user interface on the display device, wherein the game controller detects the location of the eye gaze of the player relative to the gaze-sensitive user interface using the player eye gaze data, and triggers the display controller to dynamically update the rendering of the gaze-sensitive user interface to provide a real-time or near real-time graphical animation effect displayed on the display device representative of a visual update to the gaze-sensitive user interface.

In some embodiments, the graphics processor generates left and right eye images based on a selected three-dimensional intensity level, wherein the display device is a stereoscopic display device, and wherein the game controller triggers the control command to the display controller to dynamically update the rendering of the of the left and right eye images based on the player eye gaze data.

In some embodiments, the graphical animation effect and the visual update focuses on a portion of the visible game components and blurs another portion of the visible game elements.

In some embodiments, the graphical animation effect and the visual update displays at least a portion of the visible game components in greater detail or higher resolution.

In some embodiments, the graphical animation effect and the visual update magnifies a portion of the visible game components.

In some embodiments, the viewing area has a plurality of invisible game components, and wherein the graphical animation effect and the visual update renders visible at least a portion of the invisible game components.

In some embodiments, the graphical animation effect and the visual update distorts a portion of the viewing area.

In some embodiments, the graphical animation effect and the visual update distorts a portion of the visible game components.

In some embodiments, the graphical animation effect and the visual update hides a portion of the visible game components.

In some embodiments, the graphical animation effect and the visual update selects a portion of the visible game components.

In some embodiments, the graphical animation effect and the visual update is representative of a magnetic attraction towards the location of the eye gaze of the player relative to the viewing area.

In some embodiments, the at least one data capture camera unit monitors an eye gesture of the player to collect player eye gesture data, and wherein the game controller triggers the control command to the display controller to dynamically update the rendering of the viewing area based on the player eye gesture data using the graphical animation effect to update the visible game components in the viewing area.

In some embodiments, the interactive game environment provides a reel space of a matrix of game symbols, wherein the rendering of the viewing area involves a spin animation of the reel space, and wherein the graphical animation effect involves slowing the spin animation or moving the reel space.

In some embodiments, at least one data storage device is provided that stores game data.

In some embodiments, the at least one data storage device stores game data for at least one interactive bonus game, wherein the interactive game environment provides a reel space of a matrix of game symbols, wherein the rendering of the viewing area involves a spin animation of the reel space, and wherein the graphical animation effect involves breaking a tile behind each reel space to trigger the interactive bonus game.

In some embodiments, the at least one data storage device stores game data for at least one bonus game, and wherein the game controller triggers the control command to the display controller to transition from the interactive game to the at least one bonus game based on player eye gaze data using the graphical animation effect.

In some embodiments, the at least one data storage device stores game data for at least one bonus game, and wherein the game controller triggers the control command to the display controller to dynamically update the rendering of the viewing area to provide a real-time or near real-time graphical animation effect displayed on the display device representative of a visual update to the visible game components of the bonus game in the viewing area, the visual update based on the player eye gaze data.

In some embodiments, the at least one data capture camera device is configured to collect player movement data associated with movement of the player's head.

In some embodiments, the at least one data capture camera device is configured to collect player movement data associated with movement of a part of the player's body.

In some embodiments, the at least one data capture camera device is configured to collect player movement data associated with a gesture by the player.

In some embodiments, the game controller detects the player movement relative to the viewing area using the player movement data, and triggers the control command to the display controller to dynamically update the rendering of the viewing area based on the player movement data using the graphical animation effect to update the visible game components in the viewing area.

In some embodiments, the game controller interacts with the data capture camera unit to convert the player eye gaze data relative to the display unit to the plurality of points of eye gaze relative to the displayed graphical game components for the interactive network of intercommunicating paths to compute the player pathway.

In some embodiments, there is provided an electronic gaming machine comprising: at least one data storage unit to store game data for a game, the game data comprising at least one game condition and an interactive network of intercommunicating paths, the at least one game condition being associated with traversal of the interactive network of intercommunicating paths; a graphics processor to generate an interactive game environment, wherein the interactive game environment provides graphical game components for the interactive network of intercommunicating paths and an electronic player token; a display unit to display, via a graphical user interface, the graphical game components in accordance with the game data to graphically display the interactive network of intercommunicating paths; a data capture camera unit to continuously collect player eye gaze data defined as coordinates and a line of sight relative to the display unit; a game controller for converting the collected player eye gaze data relative to the display unit to a plurality of points of eye gaze relative to the displayed graphical game components for the interactive network of intercommunicating paths; and continuously computing a player pathway based on the plurality of points of eye gaze to generate a graphical animation representative of movement of the electronic player token relative to the graphical game components for the interactive network of intercommunicating paths; and a display controller to control the display unit, via the graphical user interface, to trigger the graphical animation for the electronic player token representative of movement of the electronic player token as a mapping of the player pathway to the interactive network of intercommunicating paths, and to determine whether the at least one game condition has been satisfied to trigger transfer of an award to a token via a card reader.

In some embodiments, the coordinates include at least three-dimensional eye position coordinates based at least on a distance from a reference point of the electronic gaming machine.

In some embodiments, the converting of the collected player eye gaze data relative to the display unit to a plurality of points of eye gaze relative to the displayed graphical game components includes determining a corresponding virtual set of coordinates for use within the interactive game environment.

In some embodiments, the corresponding virtual set of coordinates for use within the interactive game environment includes a two dimensional virtual coordinate.

In some embodiments, the corresponding virtual set of coordinates for use within the interactive game environment includes a three dimensional virtual coordinate; wherein the coordinates include left eye coordinates and right eye coordinates; and wherein the game controller is configured to transform the left eye coordinates, the right eye coordinates, and the line of sight to determine the three dimensional virtual coordinate.

In some embodiments, the corresponding virtual set of coordinates are mapped to correspond to one or more virtual positions within the interactive network of intercommunicating paths.

In some embodiments, the one or more virtual positions within the interactive network of intercommunicating paths are virtual spaces within the interactive network of intercommunicating paths upon which electronic player token is able to traverse.

In some embodiments, the one or more virtual positions within the interactive network of intercommunicating paths are virtual walls within the interactive network of intercommunicating paths upon which electronic player token is able to traverse.

In some embodiments, the player pathway is continuously computed based on a tracked changes to at least one of (i) the coordinates and (ii) the line of sight relative to the display unit, in relation to the displayed graphical game components for the interactive network of intercommunicating paths during a duration of time.

In some embodiments, the duration of time includes a start time and an end time, and the start time is initiated by identifying that the collected player eye gaze correspond to a location on the display unit upon which the graphical animation for the electronic player token is being displayed.

In some embodiments, the end time is determined by the data capture camera unit identifying a pre-determined gesture of the player.

In some embodiments, the pre-determined gesture of the player includes at least one of a wink, an eye close, an eyebrow movement, a blink, a set of blinks, a looking away from the display unit.

In some embodiments, there is provided an electronic gaming machine comprising: a card reader to identify a monetary amount conveyed by a token to the electronic gaming machine; at least one data storage unit to store game data for a game, the game data comprising at least one game condition and an interactive network of intercommunicating paths, the at least one game condition being associated with traversal of the interactive network of intercommunicating paths; a graphics processor to generate an interactive game environment, wherein the interactive game environment provides graphical game components for the interactive network of intercommunicating paths and an electronic player token; a display unit to display, via a graphical user interface, the graphical game components in accordance with the game data to graphically display the interactive network of intercommunicating paths; a data capture camera unit to continuously collect player eye gaze data defined as coordinates and a line of sight relative to the display unit; a game controller for converting the collected player eye gaze data relative to the display unit to a plurality of points of eye gaze relative to the displayed graphical game components for the interactive network of intercommunicating paths; and continuously computing a player pathway based on the plurality of points of eye gaze to generate a graphical animation representative of movement of the electronic player token relative to the graphical game components for the interactive network of intercommunicating paths; a display controller to control the display unit, via the graphical user interface, to trigger the graphical animation for the electronic player token representative of movement of the electronic player token as a mapping of the player pathway to the interactive network of intercommunicating paths; and the game controller determines whether the at least one game condition has been satisfied to trigger the card reader to update the monetary amount using the token.

In some embodiments, the token is updated based on a number of the at least one game condition that have been satisfied.

In some embodiments, updating the monetary amount includes incrementing the monetary amount.

In some embodiments, updating the monetary amount includes decrementing the monetary amount.

In some embodiments, the interactive network of intercommunicating paths includes at least a virtual end position; and wherein the at least one game condition includes a game condition requiring the electronic player token to be virtually traversed to the virtual end position.

In various further aspects, the disclosure provides corresponding systems and devices, and logic structures such as machine-executable coded instruction sets for implementing such systems, devices, and methods.

In this respect, before explaining at least one embodiment in detail, it is to be understood that the embodiments are not limited in application to the details of construction and to the arrangements of the components set forth in the following description or illustrated in the drawings. Also, it is to be understood that the phraseology and terminology employed herein are for the purpose of description and should not be regarded as limiting.

Many further features and combinations thereof concerning embodiments described herein will appear to those skilled in the art following a reading of the instant disclosure.

DESCRIPTION OF THE FIGURES

In the figures, embodiments are illustrated by way of example. It is to be expressly understood that the description and figures are only for the purpose of illustration and as an aid to understanding.

Embodiments will now be described, by way of example only, with reference to the attached figures, wherein in the figures.

DETAILED DESCRIPTION

Figure 1:
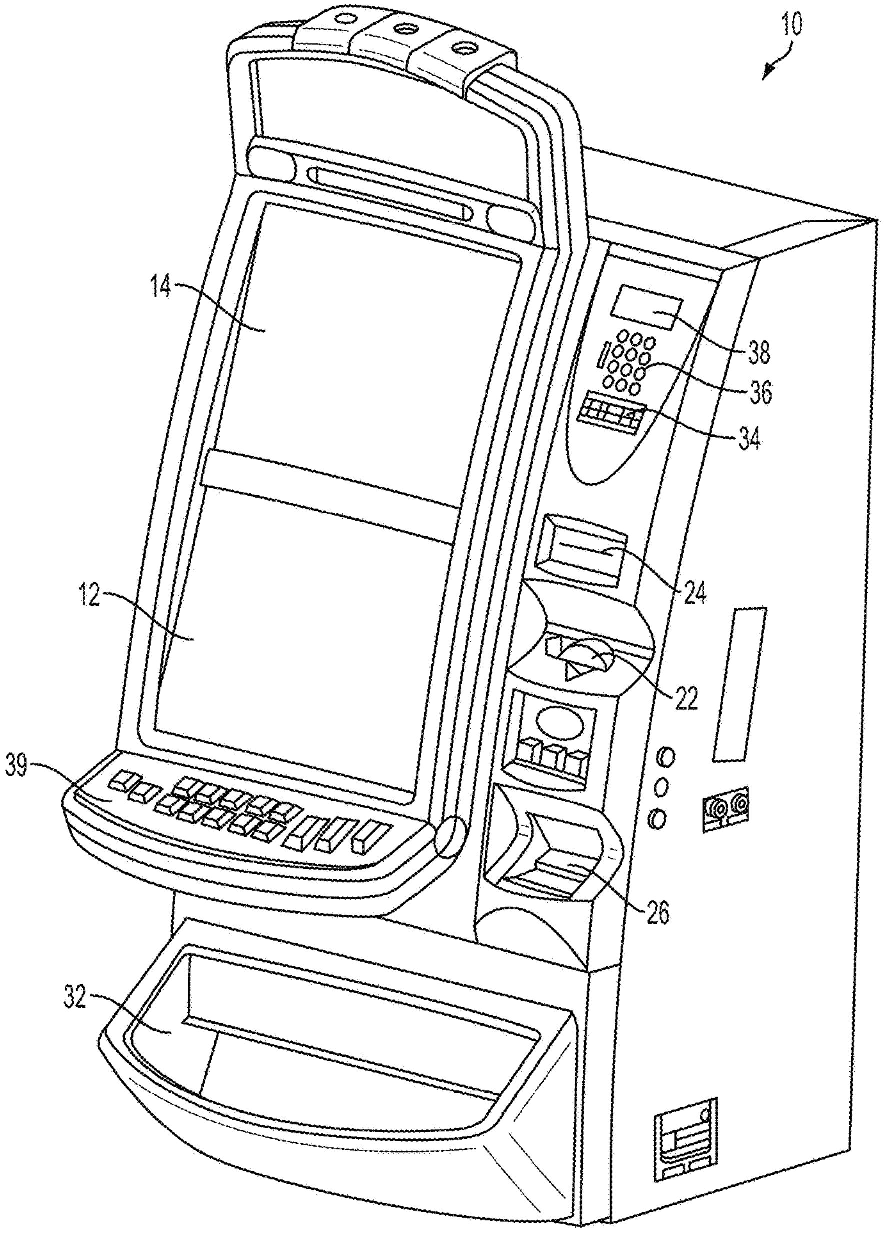
FIG. 1 is a perspective view of an electronic gaming machine for implementing the gaming enhancements according to some embodiments.

Embodiments of methods, systems, and apparatus are described through reference to the drawings.

The following discussion provides many example embodiments of the inventive subject matter. Although each embodiment represents a single combination of inventive elements, the inventive subject matter is considered to include all possible combinations of the disclosed elements. Thus if one embodiment comprises elements A, B, and C, and a second embodiment comprises elements B and D, then the inventive subject matter is also considered to include other remaining combinations of A, B, C, or D, even if not explicitly disclosed.

Embodiments described herein relate to an enhanced electronic gaming machine (EGM) where the player can play an interactive game using their eye gaze. In some embodiments, the EGM may be configured to interact with the player's eye gaze to generate, traverse, interact with, and/or a maze game wherein the player's eye gaze (and/or other inputs) is captured as an input into the game interface. The maze game provided by the EGM may, for example, provide a maze having paths that may be fully revealed and/or selectively revealed (e.g., as the player moves an avatar to traverse the maze, a "fog of war" may be lifted such that paths may be selectively revealed in response to actions taken by the player). In some embodiments, the eye gaze data may be utilized in conjunction and/or in combination with other types of detected eye gestures, such as blinks, eye openings, closings, etc.

The player's eye gaze (and/or related gaze tracking information) may be utilized to determine the movement of an avatar of a system (e.g., the avatar may be guided by the gaze), the awarding of prizes (e.g., prizes may be selected by gaze), the triggering of various trigger conditions (e.g., the gaze may be used to determine when the player has met a condition for victory, the gaze may be used to cause the screen to darken, lights to turn on), the graduated hiding/revealing of game elements (e.g., opening and/or closing an upcoming path), etc.

The EGM may also be configured to process and/or interpret the player's eye gaze such that a predictive eye gaze is determined for the player. For example, tracked information such as past eye gaze data (e.g., positions from the last half a second), the trajectory of the eye gaze, the velocity of changes of the eye gaze, changes in directionality of the eye gaze, known information relating to the current maze "path" being traversed by the player (or the player's avatar), the various derivatives of eye gaze position data (e.g., velocity, acceleration, jerk, snap), etc. may be utilized to anticipate/predict a future eye gaze position (e.g., the next gaze position will be [X,Y]) and/or path (e.g., the next gaze position appears to be the next position along a trajectory currently being tracked by the player's eye gaze). This predictive eye gaze may be utilized, in some embodiments, to interact with the interactive game, for example, predictive eye gaze data may be utilized to present various rewards and/or reveal maze pathways from the fog of war to the player.

The eye gaze and/or predicted eye gaze may be used to interact with various aspects and/or components of the maze and/or an interactive game provided by the EGM. The EGM may, in some embodiments, include one or more components, processors, and/or controllers that interpret and/or map tracked player gaze data (e.g., orientation, position, directionality, angle) in relation to the position of rendered game components, such as avatars, maze pathways, interactive components (e.g., upon determining an input directed towards a component such as a lever), etc. The mapping of the player gaze data may be indicative, for example, of a virtual and/or electronic "position" that correlates on to a particular location and/or "position" within a virtual space (e.g., a maze) generated and/or provisioned by the EGM, such as on a 2D or 3D rendering. Such renderings may not have to correlate directly to objects in reality, for example, a gaze position may be mapped on to a rendering of an impossible surface and/or various objects, designs and/or worlds which may not otherwise exist in reality (e.g., a rendering of Penrose stairs, a Penrose triangle, a blivet).

The interactive game provided by the EGM may be of various types and in some embodiments, may include interactive mazes that may be provided in the form of various geometric two-dimensional and/or three-dimensional shapes. For example, the maze may be provided as a two-dimensional maze having various elements for a player to traverse, or in some embodiments, may be a three-dimensional maze (e.g., in the form of a cube, sphere, or any other three-dimensional shape) that may include the ability to rotate and/or translate (or a combination of the two), when, for example, a player's avatar traverses to the edge of the maze (e.g., the cube rotates to show another face).

The game may include, for example, multi-player games where two or more players may interface with the electronic gaming machine (or more than one electronic gaming machines that may be communicatively linked to one another). For example, two or more players may interact with a single maze together (e.g., with two separate avatars based on the individual player's eye gaze), or interact on separate mazes that may be linked together (e.g., each player is playing on a separate electronic gaming machine and the mazes on each of the electronic gaming machines is linked together such that a player can traverse on to the maze being provided to the other player, and vice versa).

The gaze pathing and tracking aspects may, for example, be provided such that the gaze of another player and/or movement of another player's avatar in-game may be utilized to cause various actions and/or game triggers to occur. For example, a first player may be able to "lead" a path using the first player's tracked gaze, and a second player may be able to follow the first player's "lead" path through the second player's tracked gaze. Prizes may be awarded for activities wherein the two or more players interact with one another (e.g., the players have their gazes meeting, a first player's gaze follows a second player's gaze, a first player's gaze cooperates with a second player's gaze in performing a game activity).

The EGM may include at least one data capture camera device (e.g., at least one data capture camera unit) to continuously monitor the eye gaze of the player to collect player eye gaze data. The EGM may have a card reader to identify the amount of money that a player conveys to the EGM. The graphics processor of the EGM may be configured to generate an interactive game environment using the game data of an interactive game. The display device of the EGM may display a viewing area, which may be a portion of the interactive game environment. The EGM may have a game controller that can determine the location of the eye gaze of the player relative to the viewing area by mapping the location of the player eye gaze on the display device to the viewing area. The game controller may trigger a control command to the display controller of the EGM to dynamically update the rendering of the viewing area based on the player eye gaze data. In response to the control command, the display controller may control the display device in real-time or near real-time using the graphics processor to dynamically update the rendering of the viewing area to provide a real-time or near real-time graphical animation effect displayed on the display device to update the visible game components in the viewing area based on the player eye gaze data. Depending on the outcome of the interactive game, the card reader may update the monetary amount.

The EGM may include one or more data capture camera devices that may be configured with algorithms to process recorded image data to detect in real-time the position of the player's eyes in three-dimensional (3D) space and the focus of the player's gaze in two dimensional-space (2D) or 3D space. The position of the player's eyes may be the physical location of the player's eyes in 3D space. The focus of the player's gaze may be the focus of the gaze on a display device of the EGM. A player may maintain the position of the player's eyes while focusing on different areas of a display device of the EGM. A player may maintain the focus of the player's eye gaze on the same portion of a display device of the EGM while changing the position of their eyes.

The EGM may monitor the player eye gaze on the viewing area by mapping the player eye gaze on the display device to the viewing area. The EGM may dynamically update and render the viewing area in 2D or 3D. The player may play an interactive game using only the eye gaze of the player. In some embodiments, the player may play an interactive game using their eye gaze, eye gesture, movement, or any combination thereof.

The gaming enhancements described herein may be carried out using a physical EGM. EGM may be embodied in a variety of forms, machines and devices including, for example, portable devices, such as tablets and smart phones, that can access a gaming site or a portal (which may access a plurality of gaming sites) via the Internet or other communication path (e.g., a LAN or WAN), and so on. The EGM may be located in various venues, such as a casino or an arcade. One example type of EGM is described with respect to FIG. 1.

FIG. 1 is a perspective view of an EGM 10 configured to periodically and/or continuously monitor eye gaze of a player to collect player eye gaze data. A game controller may determine a location of the eye gaze of the player relative to a viewing area of the interactive game environment using the player eye gaze data and triggering a control command to a display controller to dynamically update the rendering of the viewing area based on the player eye gaze data. EGM 10 has at least one data storage device to store game data for an interactive game. The data storage device (e.g., a data storage unit) may store game data for one or more primary interactive games and one or more bonus interactive games. EGM 10 may have the display controller for detecting the control command to dynamically update the rendering of the viewing area to provide a real-time or near real-time graphical animation effect displayed on the display device representative of a visual update to one or more visible game components that may be in the viewing area.

An example embodiment of EGM 10 includes a display device 12 (e.g., a display unit) that may be a thin film transistor (TFT) display, a liquid crystal display (LCD), a cathode ray tube (CRT), auto stereoscopic 3D display and LED display, an OLED display, or any other type of display, or combinations thereof. An optional second display device 14 provides game data or other information in addition to display device 12. Display device 12, 14, may have 2D display capabilities or 3D display capabilities, or both. Gaming display device 14 may provide static information, such as an advertisement for the game, the rules of the game, pay tables, pay lines, or other information, or may even display the main game or a bonus game along with display device 12. Alternatively, the area for display device 14 may be a display glass for conveying information about the game. Display device 12, 14 may also include a camera, sensor, and other hardware input devices. Display device 12, 14 may display at least a portion of the visible game components of an interactive game.

In some embodiments, the display device 12, 14 may be a touch sensitive display device. The player may interact with the display device 12, 14 using touch control such as, but not limited to, touch, hold, swipe, and multi-touch controls. The player may use these interactions to manipulate the interactive game environment for easier viewing or preference, to manipulate game elements such as visible game components, or to select at least a portion of the visible game components depending on the design of the game. For example, the player may select one or more visible game components displayed by the display device 12, 14. As another example, the player may not have to touch the display device 12, 14 to play the interactive game. The player may instead interact with the interactive game using their eye gaze, eye gestures, and/or body movements.

EGM 10 may include a player input device or a data capture camera device to continuously detect and monitor player interaction commands (e.g., eye gaze, eye gestures, player movement, touch, gestures) to interact with the viewing area and game components displayed on the display device 12, 14. EGM 10 has a game controller for determining a location of the eye gaze of the player relative to the viewing area using the player eye gaze data collected by the at least one data capture camera device, which may continuously monitor eye gaze of a player. The game controller may trigger a control command to the display controller to dynamically update the rendering of the viewing area based on the player eye gaze data. In response to the control command, the display controller may control the display device in real-time or near real-time using the graphics processor to dynamically update the rendering of the viewing area to provide a real-time or near real-time graphical animation effect displayed on the display device that may represent a visual update to the visible game components in the viewing area, the visual update based on the player eye gaze data. In some embodiments, the control command may be based on the eye gaze, eye gesture, or the movement of the player, or any combination thereof. The eye gaze of the player may be the location on the display device where the player is looking. The eye gesture of the player may be the gesture made by the player using one or more eyes, such as widening the eyes, narrowing the eyes, blinking, and opening one eye and closing the other. The movement of the player may be the movement of the player's body, which may include head movement, hand movement, chest movement, leg movement, foot movement, or any combination thereof. A winning outcome of the game for provision of an award may be triggered based on the eye gaze, eye gesture, or the movement of the player. For example, by looking at a game component displayed by the display controller on the display device 12, 14 for a pre-determined period of time, the player may trigger a winning outcome. The award may include credits, free games, mega pot, small pot, progressive pot, and so on.

Display device 12, 14 may have a touch screen lamination that includes a transparent grid of conductors. Touching the screen may change the capacitance between the conductors, and thereby the X-Y location of the touch may be determined. The X-Y location of the touch may be mapped to positions of interest to detect selection thereof, for example, the game components of the interactive game. A processor of EGM 10 associates this X-Y location with a function to be performed. Such touch screens may be used for slot machines, for example, or other types of gaming machines. There may be an upper and lower multi-touch screen in accordance with some embodiments. One or both of display device 12, 14 may be configured to have auto stereoscopic 3D functionality to provide 3D enhancements to the interactive game environment. The touch location positions may be 3D, for example, and mapped to at least one visible game component of the plurality of visible game components.

A coin slot 22 may accept coins or tokens in one or more denominations to generate credits within EGM 10 for playing games. An input slot 24 for an optical reader and printer receives machine readable printed tickets and outputs printed tickets for use in cashless gaming. An output slot 26 may be provided for outputting various physical indicia, such as physical tokens, receipts, bar codes, etc.

In some embodiments, coin slot 22 may also provide the ability to place a wager in relation to a particular outcome associated with games, such as the satisfaction of various gaming conditions, time elapsed, time remaining, score, a successful outcome, a negative outcome, etc. A payoff may be determined, for example, based on the amount of wager, the type of wager, payoff conditions and/or quantities determined by various logical rules, an amount of jackpot available, etc.

A coin tray 32 may receive coins or tokens from a hopper upon a win or upon the player cashing out. However, the EGM 10 may be a gaming terminal that does not pay in cash but only issues a printed ticket for cashing in elsewhere. Alternatively, a stored value card may be loaded with credits based on a win, or may enable the assignment of credits to an account associated with a computer system, which may be a computer network connected computer.

A card reader slot 34 may read from various types of cards, such as smart cards, magnetic strip cards, or other types of cards conveying machine readable information. The card reader reads the inserted card for player and credit information for cashless gaming. Card reader slot 34 may read a magnetic code on a conventional player tracking card, where the code uniquely identifies the player to a host system at the venue. The code is cross-referenced by the host system to any data related to the player, and such data may affect the games offered to the player by the gaming terminal. Card reader slot 34 may also include an optical reader and printer for reading and printing coded barcodes and other information on a paper ticket. A card may also include credentials that enable the host system to access one or more accounts associated with a user. The account may be debited based on wagers by a user and credited based on a win.

The card reader slot 34 may be implemented in different ways for various embodiments. The card reader slot 34 may be an electronic reading device such as a player tracking card reader, a ticket reader, a banknote detector, a coin detector, and any other input device that can read an instrument supplied by the player for conveying a monetary amount. In the case of a tracking card, the card reader slot 34 detects the player's stored bank and applies that to the gaming machine being played. The card reader slot 34 or reading device may be an optical reader, a magnetic reader, or other type of reader. The card reader slot 34 may have a slot provided in the gaming machine for receiving the instrument. The card reader slot 34 may also have a communication interface (or control or connect to a communication interface) to digitally transfer tokens or indicia of credits or money via various methods such as RFID, tap, smart card, credit card, loyalty card, near field communication (NFC) and so on.

An electronic device may couple (by way of a wired or wireless connection) to the EGM 10 to transfer electronic data signals for player credits and the like. For example, NFC may be used to couple to EGM 10 which may be configured with NFC enabled hardware. This is a non-limiting example of a communication technique.

A keypad 36 may accept player input, such as a personal identification number (PIN) or any other player information. A display 38 above keypad 36 displays a menu for instructions and other information and provides visual feedback of the keys pressed.

Keypad 36 may be an input device such as a touchscreen, or dynamic digital button panel, in accordance with some embodiments.

Player control buttons 39 may include any buttons or other controllers needed to play the particular game or games offered by EGM 10 including, for example, a bet button, a repeat bet button, a spin reels (or play) button, a maximum bet button, a cash-out button, a display pay lines button, a display payout tables button, select icon buttons, and any other suitable button. Buttons 39 may be replaced by a touch screen with virtual buttons.

EGM 10 may also include a digital button panel. The digital button panel may include various elements such as for example, a touch display, animated buttons, frame lights, and so on. The digital button panel may have different states, such as for example, standard play containing bet steps, bonus with feature layouts, point of sale, and so on. The digital button panel may include a slider bar for adjusting the three-dimensional panel. The digital button panel may include buttons for adjusting sounds and effects. The digital button panel may include buttons for betting and selecting bonus games. The digital button panel may include a game status display. The digital button panel may include animation. The buttons of the digital button panel may include a number of different states, such as pressable but not activated, pressed and active, inactive (not pressable), certain response or information animation, and so on. The digital button panel may receive player interaction commands, in some example embodiments.

EGM 10 may also include hardware configured to provide eye, motion or gesture tracking. For example, the EGM 10 may include at least one data capture camera device, which may be one or more cameras that detect one or more spectra of light, one or more sensors (e.g. optical sensor), or a combination thereof. The at least one data capture camera device may be used for eye, gesture or motion tracking of player, such as detecting eye movement, eye gestures, player positions and movements, and generating signals defining x, y and z coordinates. For example, the at least one data capture camera device may be used to implement tracking recognition techniques to collect player eye gaze data, player eye gesture data, and player movement data. An example type of motion tracking is optical motion tracking. The motion tracking may include a body and head controller. The motion tracking may also include an eye controller. EGM 10 may implement eye-tracking recognition technology using cameras, sensors (e.g. optical sensor), data receivers and other electronic hardware to capture various forms of player input. The eye gaze, eye gesture, or motion by a player may interact with the interactive game environment or may impact the type of graphical animation effect. Accordingly, EGM 10 may be configured to capture player eye gaze input, eye gesture input, and movement input as player interaction commands.

For example, the player eye gaze data, player eye gesture data, and player movement data defining eye movement, eye gestures, player positions and movements may be used to select, manipulate, or move game components. As another example, the player eye gaze data, player eye gesture data, and player movement data defining eye movement, eye gestures, player positions and movements may be used to change a view of the gaming surface or gaming component. A visible game component of the game may be illustrated as a three-dimensional enhancement coming towards the player. Another visible game component of the game may be illustrated as a three-dimensional enhancement moving away from the player. The player's head position may be used as a view guide for the at least one data capture camera device during a three-dimensional enhancement. A player sitting directly in front of display 12, 14 may see a different view than a player moving aside. The at least one data capture camera device may also be used to detect occupancy of the machine or detect movement proximate to the machine.

Embodiments described herein are implemented by physical computer hardware embodiments. The embodiments described herein provide useful physical machines and particularly configured computer hardware arrangements of computing devices, servers, electronic gaming terminals, processors, memory, networks, for example. The embodiments described herein, for example, is directed to computer apparatuses, and methods implemented by computers through the processing of electronic data signals.

Accordingly, EGM 10 is particularly configured to provide an interactive game environment. The display device 12, 14 may display, via a user interface, the interactive game environment and the viewing area having one or more game components in accordance with a set of game data stored in a data store. The interactive game environment may be a 2D interactive game environment or a 3D interactive game environment, or a combination thereof.

A data capture camera device may capture player data, such as button input, gesture input and so on. The data capture camera device may include a camera, a sensor or other data capture electronic hardware. In some embodiments, EGM 10 may include at least one data capture camera device to continuously monitor the eye gaze of a player to collect player eye gaze data. The player may provide input to the EGM 10 using the eye gaze of the player. For example, using the eye gaze of the player, which may be collected as player eye gaze data, the player may select an interactive game to play, interact with a game component, or trigger a bonus interactive game.

Embodiments described herein involve computing devices, servers, electronic gaming terminals, receivers, transmitters, processors, memory, display, and networks particularly configured to implement various acts. The embodiments described herein are directed to electronic machines adapted for processing and transforming electromagnetic signals which represent various types of information. The embodiments described herein pervasively and integrally relate to machines, and their uses; and the embodiments described herein have no meaning or practical applicability outside their use with computer hardware, machines, a various hardware components.

As described herein, EGM 10 may be configured to provide an interactive game environment. The interactive game environment may be a 2D or 3D interactive game environment. The interactive game environment may provide a plurality of game components or game symbols based on the game data. The game data may relate to a primary interactive game or a bonus interactive game, or both. For example, the interactive game environment may comprise a 3D reel space that may have an active primary game matrix of a primary subset of game components. The bonus subset of game components may be different from the primary subset of game components. The player may view a viewing area of the interactive game environment, which may be a subset of the interactive game environment, on the display device 12, 14. The interactive game environment or the viewing area may be dynamically updated based on the eye gaze, eye gesture, or movement of the player in real-time or near real-time. The update to the interactive game environment or the viewing area may be a graphical animation effect displayed on the display device 12, 14. The update to the interactive game environment or the viewing area may be triggered based on the eye gaze, eye gesture, or movement of the player. For example, the update may be triggered by looking at a particular part of the viewing area for a pre-determined period of time, or looking at different parts of the viewing area in a pre-determined sequence, or widening or narrowing the eyes. The interactive game environment may be updated dynamically and revealed by dynamic triggers from game content of the primary interactive game in response to electronic data signals collected and processed by EGM 10.

For an interactive game environment, the EGM 10 may include a display device 12, 14 with auto stereoscopic 3D functionality. The EGM 10 may include a touch screen display for receiving touch input data to define player interaction commands. The EGM 10 may also include at least one data capture camera device, for example, to further receive player input to define player interaction commands. The EGM 10 may also include several effects and frame lights. The 3D enhancements may be an interactive game environment for additional game symbols.

EGM 10 may include an output device such as one or more speakers. The speakers may be located in various locations on the EGM 10 such as in a lower portion or upper portion. The EGM 10 may have a chair or seat portion and the speakers may be included in the seat portion to create a surround sound effect for the player. The seat portion may allow for easy upper body and head movement during play. Functions may be controllable via an on screen game menu. The EGM 10 is configurable to provide full control over all built-in functionality (lights, frame lights, sounds, and so on).

EGM 10 may also include a plurality of effects lights and frame lights. The lights may be synchronized with enhancements of the game. The EGM 10 may be configured to control color and brightness of lights. Additional custom animations (color cycle, blinking, etc.) may also be configured by EGM 10. The custom animations may be triggered by certain gaming events.

Figure 2A:
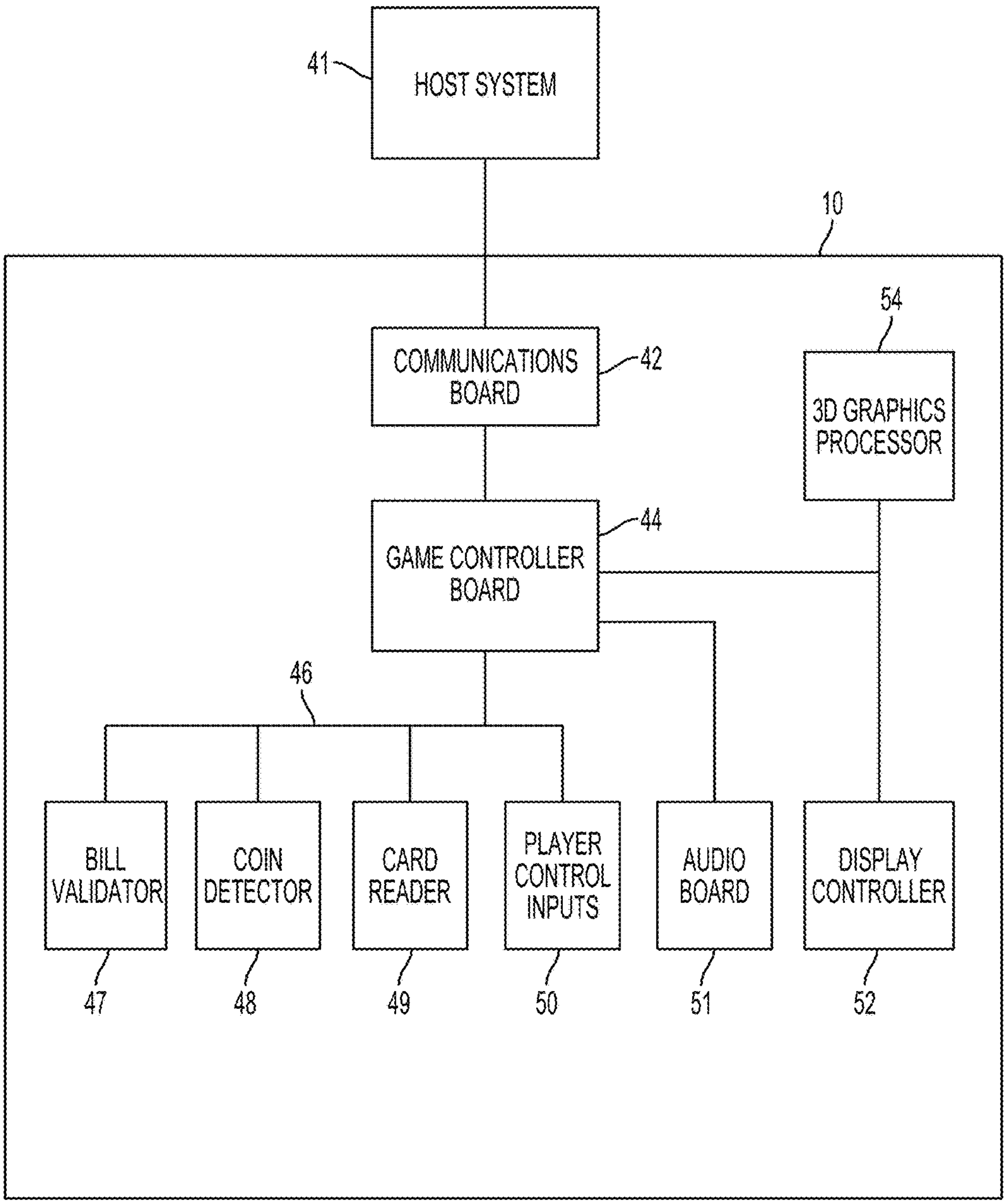
FIG. 2A is a schematic diagram of an electronic gaming machine linked to a casino host system according to some embodiments.

FIG. 2A is a block diagram of hardware components of EGM 10 according to some embodiments. EGM 10 is shown linked to the casino's host system 41 via network infrastructure. These hardware components are particularly configured to provide at least one interactive game. These hardware components may be configured to provide at least one interactive game and at least one bonus game.

A communications board 42 may contain circuitry for coupling the EGM 10 to network. Communications board 42 may include a network interface allowing EGM 10 to communicate with other components, to access and connect to network resources, to serve an application, to access other applications, and to perform other computing applications by connecting to a network (or multiple networks) capable of carrying data including the Internet, Ethernet, plain old telephone service (POTS) line, public switch telephone network (PSTN), integrated services digital network (ISDN), digital subscriber line (DSL), coaxial cable, fiber optics, satellite, mobile, wireless (e.g. WMAX), SS7 signaling network, fixed line, local area network, wide area network, and others, including any combination of these. EGM 10 may communicate over a network using a suitable protocol, such as the G2S protocols.

Communications board 42 communicates, transmits and receives data using a wireless transmitter, or it may be wired to a network, such as a local area network running throughout the casino floor, for example. Communications board 42 may set up a communication link with a master controller and may buffer data between the network and game controller board 44. Communications board 42 may also communicate with a network server, such as in accordance with the G2S standard, for exchanging information to carry out embodiments described herein.

Game controller board 44 includes memory and a processor for carrying out program instructions stored in the memory and for providing the information requested by the network. Game controller board 44 executes game routines using game data stores in a data store accessible to the game controller board 44, and cooperates with graphics processor 54 and display controller 52 to provide games with enhanced interactive game components.

EGM 10 may include at least one data capture camera device for implementing the gaming enhancements, in accordance with some embodiments. The EGM 10 may include the at least one data capture camera device, one or more sensors (e.g. optical sensor), or other hardware device configured to capture and collect in real-time or near real-time data relating to the eye gaze, eye gesture, or movement of the player, or any combination thereof.

In some embodiments, the at least one data capture camera device may be used for eye gaze tracking, eye gesture tracking, motion tracking, and movement recognition. The at least one data capture camera device may collect data defining x, y and z coordinates representing eye gaze, eye gestures, and movement of the player.

In some examples, a game component may be illustrated as a 3D enhancement coming towards the player. Another game component may be illustrated as a 3D enhancement moving away from the player. The player's head position may be used as a reference for the at least one data capture camera device during a 3D enhancement. A player sitting directly in front of display 12, 14 may see a different view than a player moving aside. The at least one data capture camera device may also be used to detect occupancy of the EGM 10 or detect movement proximate to the EGM 10. The at least one data capture camera device and/or a sensor (e.g. an optical sensor) may also be configured to detect and track the position(s) of a player's eyes or more precisely, pupils, relative to the screen of the EGM 10.

The at least one data capture camera device may also be used to collect data defining player eye movement, eye gestures, body gestures, head movement, or other body movement. Players may move their eyes, their bodies or portions of their body to interact with the interactive game. The at least one data capture camera device may collect data defining player eye movement, eye gestures, body gestures, head movement, or other body movement, process and transform the data into data defining game interactions (e.g. selecting game components, focusing game components, magnifying game components, movement for game components), and update the rendering of the viewing area to provide a real-time or near real-time graphical animation effect representative of the game interactions using the player eye gaze data, player eye gesture data, player movement data, or any combination thereof. For example, the player's eyes may be tracked by the at least one data capture camera device (or another hardware component of EGM 10), so when the player's eyes move left, right, up or down, one or more game components on display device 12, 14, may move in response to the player's eye movements. The player may have to avoid obstacles, or possibly catch or contact items to collect depending on the type of game. These movements within the game may be implemented based on the data derived from collected player eye gaze data, player eye gesture data, player movement data, or any combination thereof.

In some embodiments, the at least one data capture camera device may track a position of each eye of a player relative to display device 12, 14, as well as a direction of focus of the eyes and a point of focus on the display device 12, 14, in real-time or near real-time. The focus direction may be the direction at which the player's line of sight travels or extends from his or her eyes to display device 12, 14. The focus point may be referred to as a gaze point and the focus direction may sometimes be referred to as a gaze direction. In one example, the focus direction and focus point can be determined based on various eye tracking data such as position(s) of a player's eyes, a position of his or her head, position(s) and size(s) of the pupils, corneal reflection data, and/or size(s) of the irises. All of the above mentioned eye tracking or movement data, as well as the focus direction and focus point, may be examples of, and referred to as, player's eye movements or player movement data.

A game component may be selected to move or manipulate with the player's eye movements. The gaming component may be selected by the player or by the game. For example, the game outcome or state may determine which symbol to select for enhancement.

As previously described, the at least one data capture camera device may track a position of a player's eyes relative to display device 12, 14, as well as a focus direction and a focus point on the display device 12, 14 of the player's eyes in real-time or near real-time. The focus direction can be the direction at which the player's line of sight travels or extends from his or her eyes to the display device 12, 14. The focus point may sometimes be referred to as a gaze point and the focus direction may sometimes be referred to as a gaze direction. In one example, the focus direction and focus point can be determined based on various eye tracking data such as position(s) of a player's eyes, a position of his or her head, position(s) and size(s) of the pupils, corneal reflection data, and/or size(s) of the irises. All of the above mentioned eye tracking or movement data, as well as the focus direction and focus point, may be instances of player movement data.

In addition, a focus point may extend to or encompass different visual fields visible to the player. For example, a foveal area may be a small area surrounding a fixation point on the display device 12, 14 directly connected by a (virtual) line of sight extending from the eyes of a player. This foveal area in the player's vision may generally appear to be in sharp focus and may include one or more game components and the surrounding area. A focus point may include the foveal area immediately adjacent to the fixation point directly connected by the (virtual) line of sight extending from the player's eyes.

The player eye gaze data and player eye gesture data may relate to the movement of the player's eyes. For example, the player's eyes may move or look to the left, which may trigger a corresponding movement of a game component within the game. The movement of the player's eyes may also trigger an updated view of the entire interactive game on the display device 12, 14 to reflect the orientation of the player in relation to the display device 12, 14. The player movement data may be associated with movement of the body of the player, such as the player's head, arms legs, or other part of the player's body. As a further example, the player movement data may be associated with a gesture made by the player, such as a gesture by a hand or a finger.

In one embodiment of the invention, the EGM 10 may be configured to target, select, deselect, move, or rotate one or more game components based on player eye gaze data, player eye gesture data, and player movement data. For example, the EGM 10 may determine that a player has gazed at (e.g. the focus point has remained more or less constant) a previously unselected game component for three or more seconds, then the EGM 10 may select or highlight the game component, so the player may know that he or she may proceed to move or rotate the selected or highlighted game component. In another example, the EGM 10 may determine that after a player has selected a game component, the same player has moved his or her eyes to the right on a horizontal level for a predetermined length or period of time, then the EGM 10 may cause the selected game component to move to the right as well on a horizontal level. Similarly, the EGM 10 may determine that the player has moved his or her eyes down on a vertical level for a predetermined length or period of time, and then the EGM 10 may cause the selected game component to move to the bottom vertically.

Display controller 52 may control one or more of display device 12, 14 using graphics processor 54 to display a viewing area that may include one or more visible game components based on the game data of an interactive game.

Display controller 52 may, in response to detection of the control command from the game controller 44 based on the player eye gaze data, player eye gesture data, or player movement data, control display device 12, 14 using graphics processor 54. Display controller 52 may update the viewing area to trigger a graphical animation effect displayed on one or both of display device 12, 14 representative of a visual update to the visible game components in the viewing rea, the visual update based on the player eye gaze data, player eye gesture data, or player movement data.

In some embodiments, the player may focus their eye gaze on a game component to trigger one or more outcomes, effects, features, and/or bonus games. This may cause the player to pay more attention to the game, and may increase the enjoyment and interactivity experienced by the player. The at least one data storage device of EGM 10 may store game data for at least one interactive game and at least one bonus game. The game controller 44 may trigger the display controller 52 to transition from the at least one interactive game to the at least one bonus game based on the player eye gaze data using the graphical animation effect. The eye gaze of the player may trigger effects associated with the interactive game and/or commence the bonus game. For example, a bonus object such as a peephole may be displayed on display device 12, 14. The player may focus their eye gaze on the peephole for a pre-determined amount of time. Based on the player eye gaze data, the game controller 44 may determine that the player has focused their eye gaze on the peephole for the pre-determined amount of time, and may trigger the bonus game. The display controller 52 may control display device 12, 14 to display a graphical animation effect representative of zooming into the peephole and reveal the bonus screen. This may increase the attention paid to EGM 10 by the player and the amount of enjoyment experienced by the player when interacting with EGM 10.

The eye gaze of the player may affect the game play of the interactive game, such as triggering and transitioning from a primary interactive game to a bonus interactive game. The player may focus on a bonus object displayed on display device 12, 14 for display controller 52 to control display device 12, 14 to render and display the bonus screen of a bonus game.

Figure 2B:
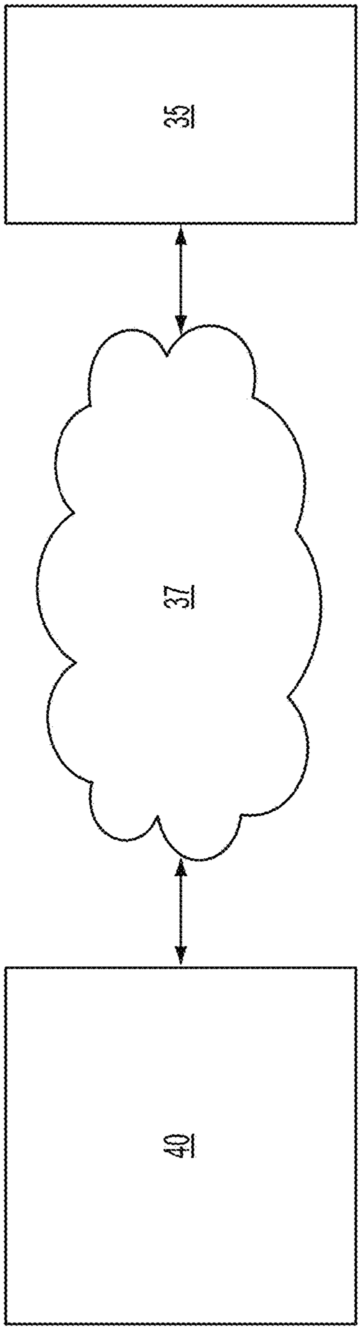
FIG. 2B is a schematic diagram of an exemplary online implementation of a computer system and online gaming system according to some embodiments.

FIG. 2B illustrates an online implementation of a gaming system that may periodically and/or continuously monitor, and in some embodiments, predict (e.g., estimate), the eye gaze of a player as described herein. The eye gaze may be monitored and/or predicted such that data relating to tracked positions, trajectories, etc., may be obtained. Data may be processed to obtain further information, such as various derivatives of eye gaze data, including, for example, velocity, acceleration, snap, and jerk. The eye gaze data may be processed (e.g., smoothed out) to remove undesirable characteristics, such as artefacts, transient movements, vibrations, and inconsistencies caused by head movements, blinking, eye irregularities, eyelid obstruction, etc.

The gaming system may be an online gaming device (which may be an example implementation of an EGM). As depicted, the gaming system includes a gaming server 40 and a gaming device 35 connected via network 37.

In some embodiments, gaming server 40 and gaming device 35 cooperate to implement the functionality of EGM 10, described above. So, aspects and technical features of EGM 10 may be implemented in part at gaming device 35, and in part at gaming server 40.

Gaming server 40 may be configured to enable online gaming, and may include game data and game logic to implement the games and enhancements disclosed herein. For example, gaming server 40 may include a player input engine configured to process player input and respond according to game rules. Gaming server 40 may include a graphics engine configured to generate the interactive game environment as disclosed herein. In some embodiments, gaming server 40 may provide rendering instructions and graphics data to gaming device 35 so that graphics may be rendered at gaming device 35.

Gaming server 40 may also include a movement recognition engine that may be used to process and interpret collected player eye gaze data, player eye gesture data, and player movement data, to transform the data into data defining manipulations and player interaction commands.

Network 37 may be any network (or multiple networks) capable of carrying data including the Internet, Ethernet, POTS line, PSTN, ISDN, DSL, coaxial cable, fiber optics, satellite, mobile, wireless (e.g. WMAX), SS7 signaling network, fixed line, local area network, wide area network, and others, including any combination of these.

Gaming device 35 may be particularly configured with hardware and software to interact with gaming server 40 via network 37 to implement gaming functionality and render 2D or 3D enhancements, as described herein. For simplicity only one gaming device 35 is shown but an electronic gaming system may include one or more gaming devices 35 operable by different players. Gaming device 35 may be implemented using one or more processors and one or more data stores configured with database(s) or file system(s), or using multiple devices or groups of storage devices distributed over a wide geographic area and connected via a network (which may be referred to as "cloud computing"). Aspects and technical features or EGM 10 may be implemented using gaming device 35.

Gaming device 35 may reside on any networked computing device, such as a personal computer, workstation, server, portable computer, mobile device, personal digital assistant, laptop, tablet, smart phone, an interactive television, video display terminals, gaming consoles, electronic reading device, and portable electronic devices or a combination of these.

Gaming device 35 may include any type of processor, such as, for example, any type of general-purpose microprocessor or microcontroller, a digital signal processing (DSP) processor, an integrated circuit, a field programmable gate array (FPGA), a reconfigurable processor, a programmable read-only memory (PROM), or any combination thereof. Gaming device 35 may include any type of computer memory that is located either internally or externally such as, for example, random-access memory (RAM), read-only memory (ROM), compact disc read-only memory (CDROM), electro-optical memory, magneto-optical memory, erasable programmable read-only memory (EPROM), and electrically-erasable programmable read-only memory (EEPROM), Ferroelectric RAM (FRAM) or the like.

Gaming device 35 is operable to register and authenticate users (using a login, unique identifier, and password for example) prior to providing access to applications, a local network, network resources, other networks and network security devices. The computing device may serve one user or multiple users.

Gaming device 35 may include one or more input devices (e.g. player control inputs 50), such as a keyboard, mouse, camera, touch screen and a microphone, and may also include one or more output devices such as a display screen (with 3D capabilities) and a speaker. Gaming device 35 has a network interface in order to communicate with other components, to access and connect to network resources, to serve an application and other applications, and perform other computing applications.

Gaming device 35 connects to gaming server 40 by way of network 37 to access technical 2D and 3D enhancements to games as described herein. Multiple gaming devices 35 may connect to gaming server 40, each gaming device 35 operated by a respective player.

Gaming device 35 may be configured to connect to one or more other gaming devices through, for example network 37. In some embodiments the gaming server 40 may be utilized to coordinate the gaming devices 35. Where gaming devices 35 may be utilized to facilitate the playing of a same game (e.g., having a traversable maze) wherein the game includes at least sections where there is interaction between activities performed by a player on the gaming devices 35, various elements of information may be communicated across network 37 (and in some embodiments, through gaming server 40). For example the elements of information may include player gaze position data (which may include prior gaze position data as well as present and/or predicted gaze position data), characteristics of electronic tokens (e.g., position, velocity, movement destination, movement origin), among others. This information may be used by each of the gaming devices 35 to provision and/or display interfaces that take into consideration the received data from another gaming device 35. For example, a maze game may be shown, where other the tokens of other gamers may be displayed, and in some embodiments, the gaming devices 35 may be configured for cooperative and/or competitive play (or a combination thereof) between the players in relation to various game objectives, events and/or triggers.

Figure 3:
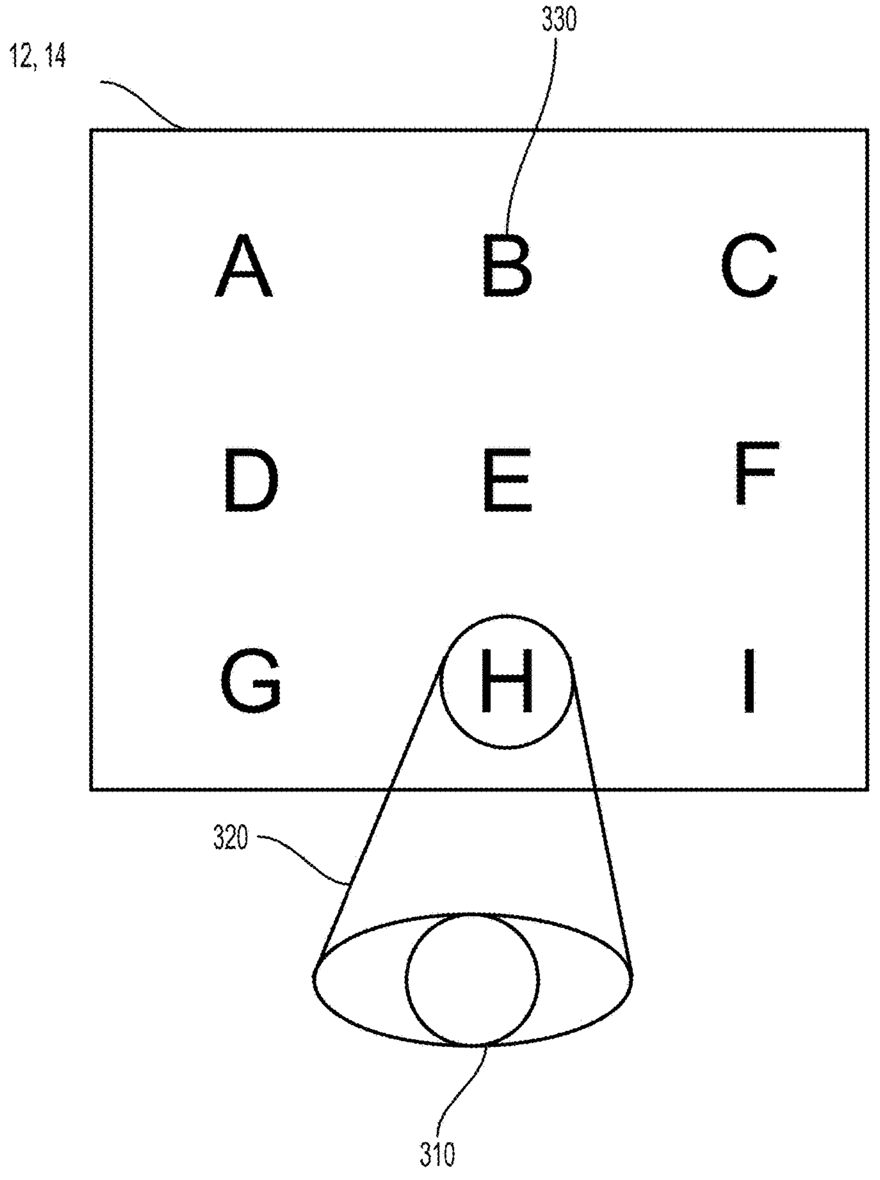
FIG. 3 is a schematic diagram illustrating a calibration process for the electronic gaming machine according to some embodiments.

FIG. 3 is a schematic diagram illustrating a calibration process for the electronic gaming machine according to some embodiments. In some embodiments, the at least one data capture camera device and the display device 12, 14 may be calibrated. Calibration of the at least one data capture camera device and the display device may be desirable because the eyes of each player using the EGM 10 may be physically different, such as the shape and location of the player's eyes, and the capability for each player to see. Each player may also stand at a different position relative to the EGM 10.

The at least one data capture camera device may be calibrated by the game controller 44 by detecting the movement of the player's eyes. In some embodiments, the display controller 52 may control the display device 12, 14 to display one or more calibration symbols. There may be one calibration symbol that appears on the display device 12, 14 at one time, or more than one calibration symbol may appear on the display device 12, 14 at one time. The player may be prompted by text, noise, graphical animation effect, or any combination thereof, to direct their eye gaze to one or more of the calibration symbols. The at least one data capture camera device may monitor the eye gaze of the player looking at the one or more calibration symbols and a distance of the player's eyes relative to the EGM 10 to collect calibration data. Based on the eye gaze corresponding to the player looking at different calibration symbols, the at least one data capture camera device may record data associated with how the player's eyes rotate to look from one position on the display device 12, 14 to a second position on the display device 12, 14. The game controller 44 may calibrate the at least one data capture camera device based on the calibration data.

For example, as shown in FIG. 3, before the player 310 plays the interactive game, the EGM 10 may notify the player 310 that the at least one data capture camera device (not shown) and the display device 12, 14 may be calibrated. The display controller 52 may cause the display device 12, 14 to display one or more calibration symbols 330. In FIG. 3, nine calibration symbols 330 "A" through "I" are displayed, but the calibration symbols 330 may be any other symbols. For example, the calibration symbols 330 may be one or more game components related to the interactive game to be played. The calibration symbols 330 may be displayed on any portion of the display device 12, 14. The player 310 may be prompted to look at the calibration symbols in a certain order. The at least one data capture camera device may monitor the eye gaze 320 of the player 310 looking at the calibration symbols 330 and the distance of the player's eyes relative to the EGM 10 to collect the calibration data. When the at least one data capture camera device collects player eye gaze data in real-time, the game controller 44 may compare the player eye gaze data with the calibration data in real-time to determine the angle at which that the player's eyes are looking.

The display controller 52 may calibrate the display device 12, 14 using the graphics processor 54 based on the calibration data collected by the at least one data capture camera device. The at least one data capture camera device may monitor the eye gaze of the player to collect calibration data as described herein. The display controller 52 may calibrate the display device 12, 14 using the graphics processor 54 to display a certain resolution on the display device 12, 14.

Figure 4:
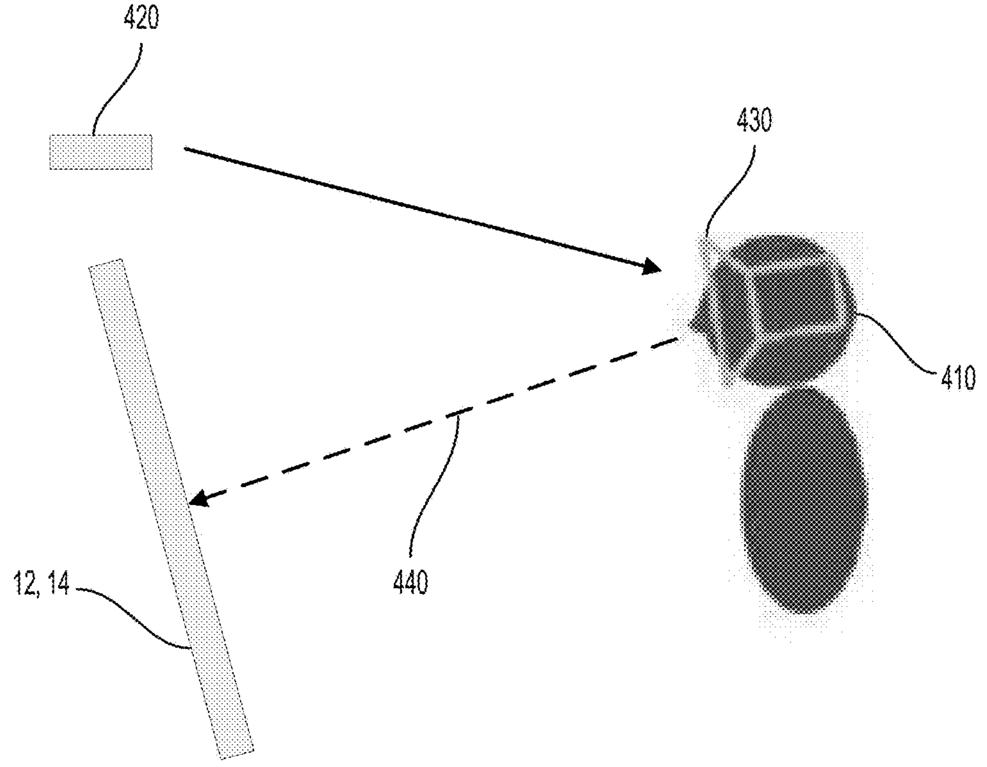
FIG. 4 is a schematic diagram illustrating the mapping of a player's eye gaze to the viewing area according to some embodiments.

FIG. 4 is a schematic diagram illustrating the mapping of a player's eye gaze to the viewing area, according to some embodiments. In some embodiments, the game controller 44 may determine the location of the eye gaze relative to the viewing area based on the position of the player's eyes relative to the EGM 10 and an angle of the player's eyes.

As shown in FIG. 4, the at least one data capture camera device 420 may monitor the position of the player's eyes 430 relative to EGM 10, and may also monitor the angle of the player's eyes 430 to collect display mapping data. The angle of the player's eyes may be determined based on the calibration of the at least one data capture camera device 420 described herein. The angle of the player's eyes may define the focus of the eye gaze, which may be a line of sight relative to the display device 12, 14. Based on the display mapping data, which may comprise the position of the player's eyes relative to the EGM 10 and an angle of the player's eyes or the line of sight relative, the game controller 44 may be configured to determine the direction and length of a virtual array 440 projecting from the player's eyes 430. Virtual array 440 may represent the eye gaze of the player 410. The game controller 44 may determine where the virtual array 440 intersects with the display device 12, 14. The intersection of virtual array 440 and display device 12, 14 may represent where the eye gaze of the player 410 is focused on the display device 12, 14. The display device 12, 14 may be controlled by display controller 52 to display the viewing area. The game controller 44 may identify coordinates on the display device 12, 14 corresponding to the player eye gaze data and may map the coordinates to the viewing area to determine the eye gaze of the player relative to the viewing area. EGM 10 may determine the location of the viewing area that the player 410 is looking at, which may be useful for EGM 10 to determine how the player 410 is interacting with the interactive game. In some embodiments, the eye gaze of the player may be expressed in 2D or 3D and may be mapped to a 2D or 3D viewing area, depending on whether the interactive game is a 2D interactive game or a 3D interactive game.

Peripheral devices/boards communicate with the game controller board 44 via a bus 46 using, for example, an RS-232 interface. Such peripherals may include a bill validator 47, a coin detector 48, a smart card reader or other type of credit card reader 49, and player control inputs 50 (such as buttons or a touch screen).

Player input or control device 50 may include the keypad, the buttons, touchscreen display, gesture tracking hardware, and data capture device as described herein. Other peripherals may be one or more cameras used for collecting player input data, or other player movement or gesture data that may be used to trigger player interaction commands. Display device 12, 14 may be a touch sensitive display device. Player control input device 50 may be integrated with display device 12, 14 to detect player interaction input at the display device 12, 14.

Game controller board 44 may also control one or more devices that produce the game output including audio and video output associated with a particular game that is presented to the user. For example, audio board 51 may convert coded signals into analog signals for driving speakers.

Game controller board 44 may be coupled to an electronic data store storing game data for one or more interactive games. The game data may be for a primary interactive game and/or a bonus interactive game. The game data may, for example, include a set of game instructions for each of the one or more interactive games. The electronic data store may reside in a data storage device, e.g., a hard disk drive, a solid state drive, or the like. Such a data storage device may be included in EGM 10, or may reside at host system 41. In some embodiments, the electronic data store storing game data may reside in the cloud.

Card reader 49 reads cards for player and credit information for cashless gaming. Card reader 49 may read a magnetic code on a conventional player tracking card, where the code uniquely identifies the player to a host system at the venue. The code is cross-referenced by host system 41 to any data related to the player, and such data may affect the games offered to the player by the gaming terminal. Card reader 49 may also include an optical reader and printer for reading and printing coded barcodes and other information on a paper ticket. A card may also include credentials that enable host system 41 to access one or more accounts associated with a user. The account may be debited based on wagers by a user and credited based on a win.

Graphics processor 54 may be configured to generate and render animation game enhancements based on game data as directed by game controller board 44. The game enhancements may involve an interactive game environment that may provide one or more game components and graphical animation effects. Graphics processor 54 may be a specialized electronic circuit designed for image processing (including 2D and 3D image processing in some examples) in order to manipulate and transform data stored in memory to accelerate the creation of images in a frame buffer for output to the display by way of display controller 52. Graphics processor 54 may redraw various game enhancements as they dynamically update. Graphics processor 54 may cooperate with game controller board 44 and display controller 52 to generate and render enhancements as described herein. Graphics processor 54 may generate an interactive game environment that may provide one or more game components, for example, a 3D reel space of a plurality of game components. The graphics processor 54 may generate graphical animation effects to represent a visual update to the game components in the viewing area, the visual update based on the player eye gaze data, player eye gesture data, player movement data, or any combination thereof.

Display controller 52 may require a high data transfer rate and may convert coded signals to pixel signals for the display. Display controller 52 and audio board 51 may be directly connected to parallel ports on the game controller board 44. The electronics on the various boards may be combined onto a single board. Display controller 52 may control output to one or more display device 12, 14 (e.g. an electronic touch sensitive display device). Display controller 52 may cooperate with graphics processor 54 to render animation enhancements on display device 12, 14.

Display controller 52 may be configured to interact with graphics processor 54 to control the display device 12, 14 to display a viewing area defining the interactive game environment including navigation to different views of the interactive game environment. Player control inputs 50 and the at least one data capture camera device may continuously detect player interaction commands to interact with interactive game environment. For example, the player may move a game component to a preferred position, select a game component, or manipulate the display of the game components.

In some embodiments, display controller 52 may control the display device 12, 14 using the graphics processor 54 to display the viewing area that may have one or more game components. In response to the detection of the control command based on the player eye gaze data, player eye gesture data, player movement data, or any combination thereof, display controller 52 may trigger a graphical animation effect to represent a visual update to the game components in the viewing area.

While playing an interactive game on the EGM 10, the eyes of a player may move suddenly without the player being conscious of the movement. The eyes of the player may demonstrate subconscious, quick, and short movements, even if the player is not actively controlling their eyes to move in this manner. These subconscious, quick, and short eye movements may affect the game controller's determination of the eye gaze of the player based on the player eye gaze data. Accurate processing of the player eye gaze data related to these subconscious, quick, and short eye movements may result in detecting the location of the eye gaze of the player representative of eye twitching or erratic eye movements not reflective of the player's intended eye gaze, and may be distracting to the player. It may be useful for the player eye gaze data to be filtered to not reflect these quick and short eye movements, for example, so the determination of the eye gaze of the player relative to the viewing area by the game controller reflects the intended eye gaze of the player. It may also be useful for the portion of the player eye gaze data representative of the subconscious, quick, and short eye movements to have less determinative effect on the determined location of the eye gaze of the player. In some embodiments, the game controller 44 may define a filter movement threshold, wherein the game controller, prior to determining a location of the eye gaze of the player relative to the viewing area using the player eye gaze data and updating the rendering of the viewing area, determines that the player eye gaze meets the filter movement threshold. The game controller 44 may "smooth out" sudden and subconscious eye movement.

For example, the game controller 44 may delay in processing the player eye gaze data associated with subconscious, quick, and short eye movements, so the detected location of the eye gaze of the player does not represent twitching or sudden unconscious eye movements. Large eye motions may also be associated with more delay in processing and more smoothing. In some embodiments, the game controller may partition the player eye gaze data associated with large eye motions into data representative of shorter eye motions. The game controller 44 may analyze the player eye gaze data to determine which data is associated with subconscious eye movement or with conscious eye movement based on a filter movement threshold, a time threshold, movement threshold, or any combination thereof. Player eye gaze data associated with quick eye movements over a certain period of time may be determined by the game controller 44 to be subconscious eye movement. The game controller 44 may delay in processing this portion of data so the detected location of the eye gaze of the player may be stable and may not distract the player, or the game controller may filter out this data and not process it. Player eye gaze data associated with large eye movements over a certain period of time may be determined by the game controller to be the player losing focus or being distracted. The game controller 44 may similarly delay in processing this portion of data or not process this portion of data.

The locations where EGM 10 may be used may have a variety of lighting conditions. For example, EGM 10 may be used in a restaurant, a hotel lobby, an airport, and a casino. It may be brighter in some locations and darker in other locations, or the light quality may fluctuate from brightness to darkness. In some embodiments, EGM 10 may include an infrared light source that illuminates the player. The infrared light sources may not interfere with the eyes of the player. In some embodiments, the at least one data capture camera device may be an infrared data capture camera device.

The infrared data capture camera device may collect player eye gaze data, player eye gesture data, and player movement data without being affected by the lighting conditions of the locations where EGM 10 may be used. In some embodiments, EGM 10 may have a plurality of light sources providing a plurality of spectra of light, and the at least one data capture camera device may be a plurality of data capture camera devices configured to detect a plurality of spectra of light, so the at least one data capture camera device may collect player eye gaze data, player eye gesture data, and player movement data without being affected by the lighting conditions of the locations where EGM 10 may be used.

A player that plays an interactive game using EGM 10 may be wearing glasses. The glasses of the player may cause refractions of the light that illuminates the player. This may affect the at least one data capture camera device while it monitors the eye gaze, eye gesture, and/or movement of the player. Glasses that comprise an infrared filter may also interfere with or affect the at least one data capture camera device while it monitors the eye gaze, eye gesture, and/or movement of the player. EGM 10 may recognize that the player may be wearing glasses. For example, as the interactive game commences, display controller 52 may display on display device 12, 14 using graphics processor 54 a question asking the player if he or she is wearing glasses. The player may provide input indicating whether he or she is wearing glasses, such as, but not limited to, with an audio command, touch command, or with the player's eye gaze. As other example, the game controller 44 may recognize, based on processing the player eye gaze data from the at least one data capture camera device, that the light illuminating the player may be refracted, and may determine that the player is wearing glasses. When EGM 10 recognizes that the player may be wearing glasses, the game controller 44 may perform additional and/or more stringent filtering functions as described herein to compromise for the player's use of glasses and to accommodate the refractions of the light that illuminates the player. For example, the filter movement threshold may be set to be higher for players who wear glasses.

In some embodiments, the game controller 44 may be configured to predict the location of the eye gaze of the player relative to the viewing area at a future time using the player eye gaze data to facilitate dynamic update to the rendering of the viewing area. For example, if the game controller 44 determines that a player is changing their gaze on a horizontal plane from the left to the right, the game controller 44 may predict that the player may look at a game component displayed on the right side of display device 12, 14. The ability for game controller 44 to predict the location of the eye gaze of the player at a future time may be useful to rule out inaccurate readings.

For example, while a player plays a game, the at least one data capture camera device may incorrectly detect a button on the clothing of a player to be the player's eyes, and may collect incorrect player eye gaze data based on the button. Based on the location of the eye gaze predicted by game controller 44, the incorrect player eye gaze data may be ruled out by game controller 44, and may not be processed by game controller 44 to trigger a control command to update the viewing area with a graphical animation effect.

As another example, by predicting the location of the eye gaze, the display controller 52 may adjust the resolution of the display device 12, 14 where the player is not expected to be looking. This may be useful because the EGM 10 may have limited processing power. Not all visible game components may require high resolution. Only the game components that the player is looking at may require high resolution. The ability for game controller 44 to predict the location of the eye gaze of the player may allow display controller 52 to reduce the resolution of game components that the player may not be looking at, which may increase the efficiency of the processing power of the EGM 10.

In some embodiments, the player may play an interactive game with EGM 10 in communication with a mobile device. Depending on the game data of the interactive game, the player may play the interactive game on EGM 10, on the mobile device, or on both. The player may play the interactive game using their eye gaze, eye gestures, movement, the interface of the mobile device, or any combination thereof. The player may play the interactive game using only the eye gaze of the player while the player holds on to the mobile device with one or more hands. The mobile device may, for example, be a computer, personal digital assistant, laptop, tablet, smart phone, media player, electronic reading device, data communication device, or a wearable device, such as Google™ Glass, virtual reality device, or any combination thereof. The mobile device may be a custom mobile device that may be in communication with EGM 10.

The mobile device may be operable by a user and may be any portable, networked (wired or wireless) computing device including a processor and memory and suitable for facilitating communication between one or more computing applications of mobile device (e.g. a computing application installed on or running on the mobile device). A mobile device may be a two-way communication device with advanced data communication capabilities having the capability to communicate with other computer systems and devices. The mobile device may include the capability for data communications and may also include the capability for voice communications, in some example embodiments. The mobile device may have at least one data capture camera device to continuously monitor the eye gaze, eye gesture, or movement of the player and collect player eye gaze data, player eye gesture data, or player movement data.

EGM 10 may include a wireless transceiver that may communicate with the mobile device, for example using standard WiFi or Bluetooth, or other protocol based on the wireless communication capabilities of the mobile device. The player may be able to play the interactive game while the mobile device is in communication with EGM 10. When connected to the EGM 10, the viewing area may be displayed on display device 12, 14 or on the screen of the mobile device, or both. The at least one data capture camera device on the mobile device may collect player eye gaze data, player eye gesture data, or player movement data, which may be processed by a game controller 44 of EGM 10 to determine a location of the eye gaze of the player relative to the viewing area displayed on the mobile device. The game controller 44 may trigger a control command to the display controller 52 to dynamically update the rendering of the viewing area based on the player eye gaze data, player eye gesture data, or player movement data. In response to the control command from the game controller 44, the display controller 52 may control the display device 12, 14, the mobile device, or both, in real-time or near real-time using the graphics processor 54 to dynamically update the rendering of the viewing area to provide a real-time or near real-time graphical animation effect displayed on the display device 12, 14 or the mobile device representative of a visual update to the game components in the viewing area, the visual update based on the player eye gaze data, player eye gesture data, or player movement data.

In some embodiments, the mobile device in communication with EGM 10 may be configured to be a display device that compliments display device 12, 14 when playing the interactive game. The player may interact with the interactive game through the interface of the mobile device, through the EGM 10, or any combination thereof. The interactive game environment, viewing area, and game components of the interactive game may be displayed on the mobile device, display device 12, 14, or any combination thereof.

In some embodiments, a terminal may be connected to one or more EGM 10 over a network. The terminal may serve as a registration terminal for setting up the communication between the mobile device and any EGM 10 connected to the network. Therefore, the player does not have to physically go to EGM 10 to set up the link and play the interactive game associated with EGM 10.

Host system 41 may store account data for players. EGM 10 may communicate with host system 41 to update such account data, for example, based on wins and losses. In an embodiment, host system 41 stores the aforementioned game data, and EGM 10 may retrieve such game data from host system 41 during operation.

In some embodiments, the electronics on the various boards described herein may be combined onto a single board. Similarly, in some embodiments, the electronics on the various controllers and processors described herein may be integrated. For example, the processor of game controller board 44 and graphics processor 54 may be a single integrated chip.

EGM 10 may be configured to provide one or more player eye gaze, eye gesture, or movement interactions to one or more games playable at EGM 10. The enhancements may be to a primary interactive game, secondary interactive game, bonus interactive game, or combination thereof.

In some embodiments, EGM 10 may apply one or more predictive techniques to develop a plurality of predicted points of eye gaze, which, for example, may approximate and/or estimate where a player's gaze will travel next. These predictions may also be provided for use by graphics processor 54 and/or game controller board 44 in relation with smoothing out and/or accounting for removal of transient readings, undesirable artefacts and/or inadvertent gaze positions. In some embodiments, the predictions may also be used to improve the performance of EGM 10 in relation to gaze capture and/or processing thereof, by, for example, applying heuristic techniques to reduce the number of computations and/or capture frequency by relying on predictions to interpolate and/or extrapolate between gaze positions captured.

For example, when a player views an area in a game or a maze, the EGM 10 may record where they were looking and what events are being displayed to the player (e.g., as first movements and/or gaze positions). When an event is triggered a second time, the player's gaze movements are recorded into a data storage system, but then compared to the first movements. A comparison may include, for example, comparing positions, velocities, start and end positions, accelerations, etc. as between various gaze movements.

For example, for each duration, a path start and end location may be calculated, and a predicted pathway may be developed based on these locations and stored in a data storage.

As the event is triggered more times (e.g., more iterations occur), the data may be accumulated and a predictive pathing model can be built. Once the predictive pathing model is developed, when the event is triggered, the EGM 10 could reduce the frequency of the gaze system updates and use the recorded pathing and final location to be used to reduce the overall computing resources required, for example (e.g., performing various steps of interpolation, extrapolation using the predictive pathing model).

Accordingly, predictive pathing can also be used to reduce errors being produced by the gaze system. Gaze systems may utilize cameras and edge detection to determine where the player is looking, and many utilize use infra-red light to see the player's eye. If there are other infra-red light sources, for example, such sources may cause the gaze camera to be impacted and may reduce accuracy of the gaze detection. Accordingly, predictive pathing may be useful to reduce error in similar situations where there may otherwise be recorded errors and/or aberrations.

Further, predictions may not be limited only to a current player. For example, aggregate information from a large population of players may be aggregated together to refine the model for predictive pathing. The model may, for example, take into consideration the type of player, the type of interaction the player is having with the EGM 10, the characteristics of the player (e.g., height, gender, angle of incidence), among others.

In some embodiments, the predictive pathing model may also be utilized in the context of a game. For example, if the game includes aspects which may be selectively triggered based on various inputs, an input for triggering may include predicted pathways. In some embodiments, objects and/or layers may be modified and/or altered. As described further in the description, some embodiments may include a maze game wherein a concealment layer may be selectively and/or gradually revealed based on various interactions, activities and/or events occurring. In some embodiments, such revealing may be provided, at least in part, using the predictive pathway model (e.g., a player's gaze is predicted at a particular location, and therefore that area of the concealment layer is modified to become revealed).

Figure 5:
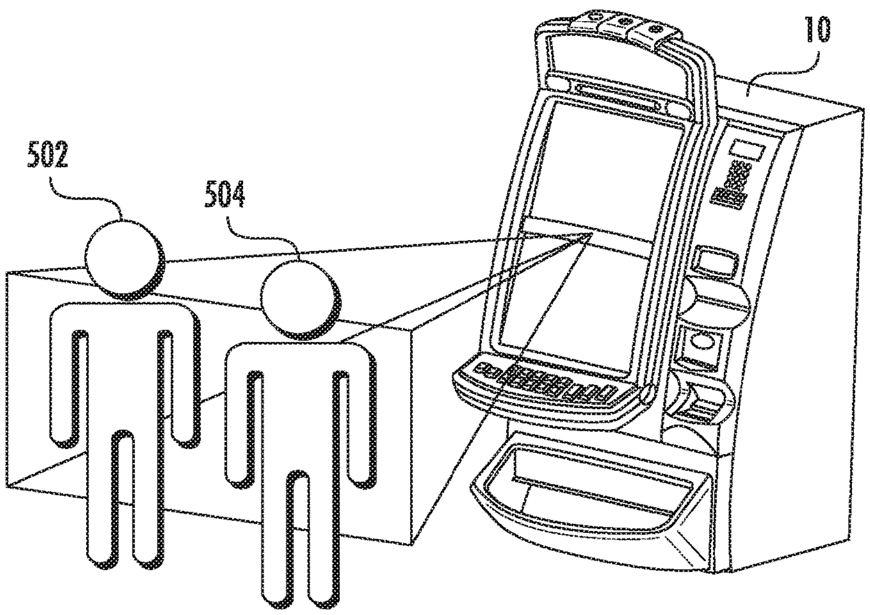
FIG. 5 is a schematic diagram illustrating an electronic gaming machine displaying an advertisement based on collected proximity data according to some embodiments.

FIG. 5 is a schematic diagram illustrating an electronic gaming machine displaying a display screen based on collected proximity data according to some embodiments. In some embodiments, the EGM 10 may recognize potential players proximate to the EGM 10.

As shown in FIG. 5, the at least one data capture camera device may periodically and/or continuously monitor an area proximate to the EGM 10 to collect proximity data. The game controller 44 may process the proximity data to detect if a person is proximate to the EGM 10. If a person is detected proximate to the EGM 10, then the display controller 52 controls the display device 12, 14 to display a display screen, such as an advertisement. The ability for EGM 10 to recognize potential players proximate to the EGM 10 and commence active self-promotion is useful to gain a competitive advantage over other gaming machines. It may also be useful for welcoming and encouraging players to play the game and provide the player with a sense of astonishment. In contrast to a gaming machine that may interact with a player after the player has inserted a ticket, pressed a button, or touched a screen, may EGM 10 actively start the player's decision-making process to interact with EGM 10 sooner.

In some embodiments, the display controller 52 may render a gaze-sensitive user interface on the display device 12, 14, wherein the game controller 44 detects the location of the eye gaze of the player relative to the viewing area using the player eye gaze data, and triggers the control command to display controller 52 to dynamically update the rendering of the viewing area to provide a real-time or near real-time the graphical animation effect displayed on the display device 12, 14 representative of a visual update to the gaze-sensitive user interface.

The at least one data capture camera device may, for example, capture the and/or monitor the gaze data of two or more persons (e.g., person 502 and person 504 standing in front of EGM 10), which may, for example, be two or more players of a game. The gaze data may be used such that both players are able to play the game simultaneously (e.g., both players have representative tokens that are displayed on display devices 12, 14, and controlled in a gaze-sensitive user interface).

Figure 6A:
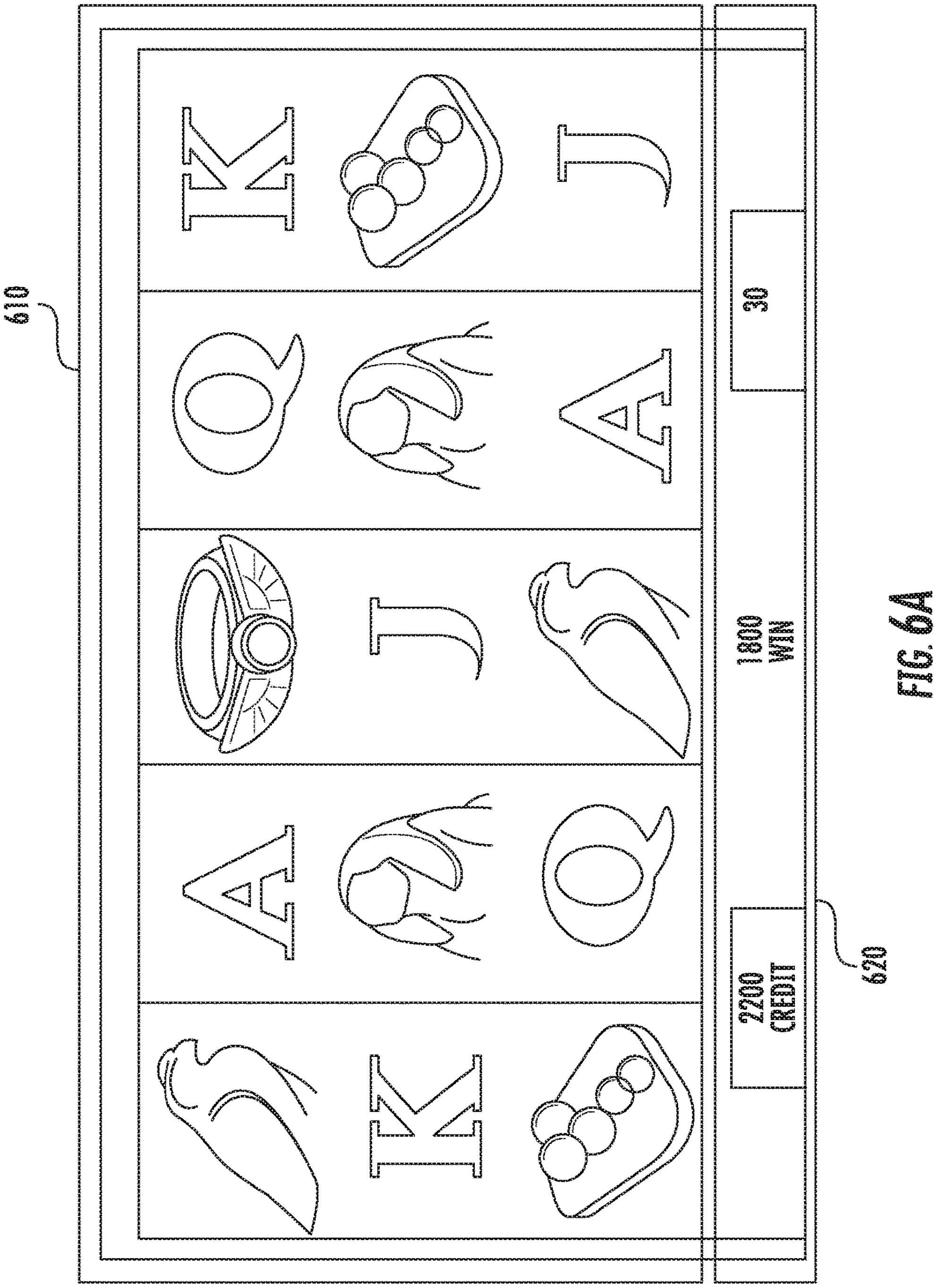
FIGS. 6A and 6B are schematic diagrams illustrating a gaze-sensitive user interface according to some embodiments.
Figure 6B:
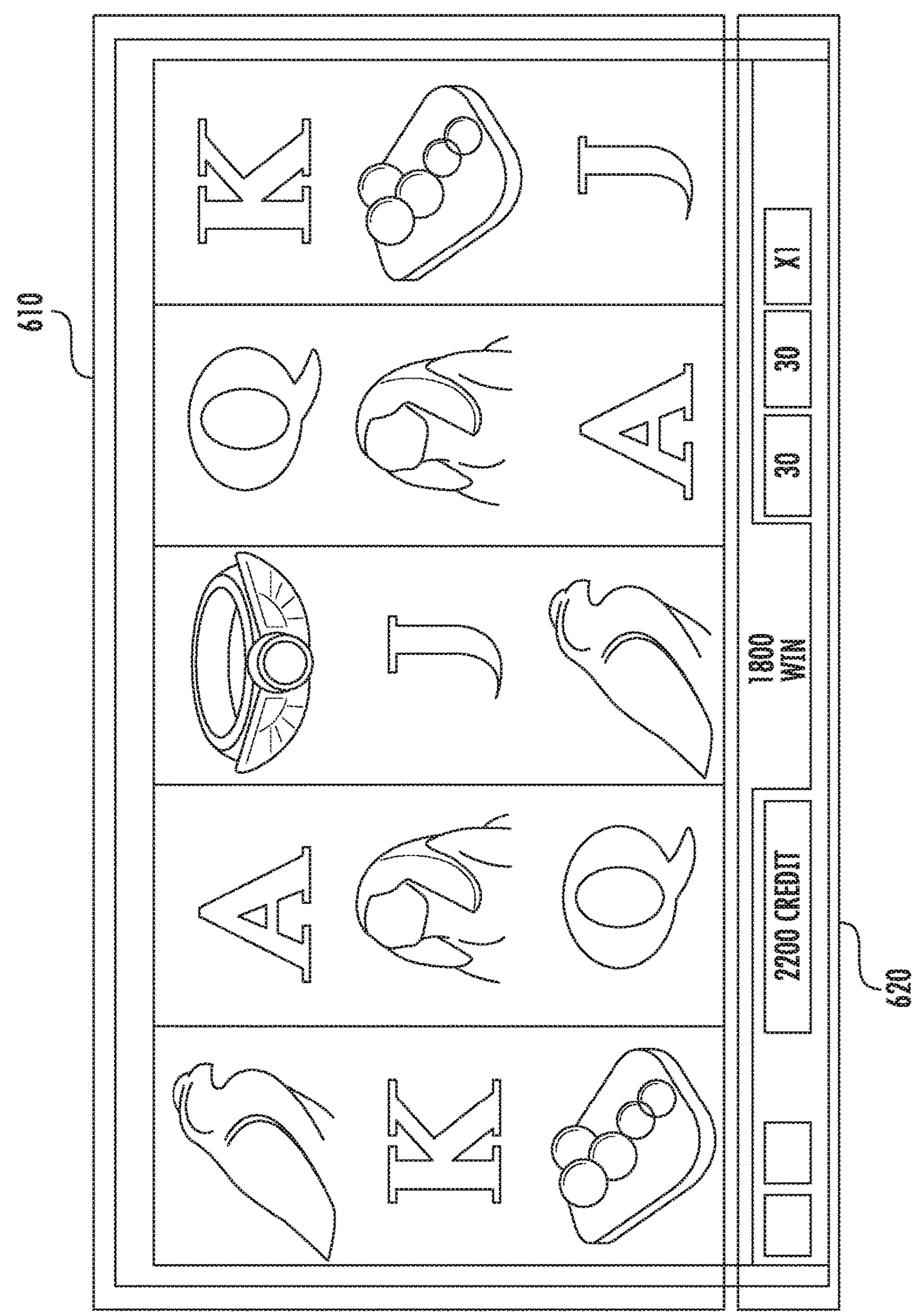

In some embodiments, the display controller 52 may render a gaze-sensitive user interface on the display device 12, 14, wherein the game controller 44 detects the location of the eye gaze of the player relative to the viewing area using the player eye gaze data, and triggers the control command to display controller 52 to dynamically update the rendering of the viewing area to provide a real-time or near real-time the graphical animation effect displayed on the display device 12, 14 representative of a visual update to the gaze-sensitive user interface. For example, display controller 52 may control display device 12, 14 to display a gaze-sensitive user interface as shown in FIG. 6A and FIG. 6B. The player may gaze at the one or more visible game components 610 at the top of the display device 12, 14, and the display controller 52 may cause a graphical animation effect to be displayed representative of reducing the size of or hiding an options menu 620 at the bottom of the display device 12, 14.

As shown in FIG. 6A, the options menu 620 may be small and out of the way. As the options menu 620 is being hidden, display controller 52 may cause another graphical animation effect to be displayed representative of enlarging the one or more visible game components 610 to use the portion of the display device 12, 14 vacated by the options menu 620. As another example, as illustrated in FIG. 6B, the player may gaze at the bottom of the display device 12, 14, which may cause the options menu 620 to be revealed and additional options may appear on screen. When the option menu 620 is revealed, the one or more visible game components 610 may reduce in size to accommodate the options menu 620. The player may gaze at a specific area of display device 12, 14, and additional information may be displayed on display device 12, 14. Even though the EGM 10 may have one or two display device 12, 14, a gaze-sensitive user interface may effectively increase the size of the display devices available to EGM 10. For example, as illustrated in FIGS. 6A and 6B, display device 12, 14 may display one or more visible game components 610 and an options menu 620 without requiring an increase in size of the display device 12, 14. The gaze-sensitive user interface may optimize the use of the limited space available on display device 12, 14. By monitoring the eye gaze of the player, EGM 10 may demonstrate context awareness of what the player is looking at. For example, the EGM 10 may detect when the player is distracted by detecting whether the eye gaze of the player is on the display device 12, 14.

EGM 10 may reward a player for maintaining their eye gaze on positive game aspects. For example, the at least one data capture display device may collect player eye gaze data that may indicate that the player is looking at a particular positive game component, such as, but not limited to, a positive game component representative of the rewarding of points, credits, prizes, or a winning line on a reel game. The display controller 52 may control the display device 12, 14 to display a graphical animation effect to enhance the positive game component with additional fanfare, for example, a special particle effect, fireworks, additional resolution and/or size of the positive game component, greater colour contrast and brightness, or lights and noises. In some embodiments, the graphical animation effect may correlate with the amount of time the player has maintained their eye gaze on the positive game component. The longer the player focuses their eye gaze on the positive game component, the more graphical animation effects may be displayed by display controller 52 on display device 12, 14 and/or the duration of the graphical animation effects may be extended. The EGM 10 may include a display device 12, 14 with auto stereoscopic 3D functionality.

Figure 7:
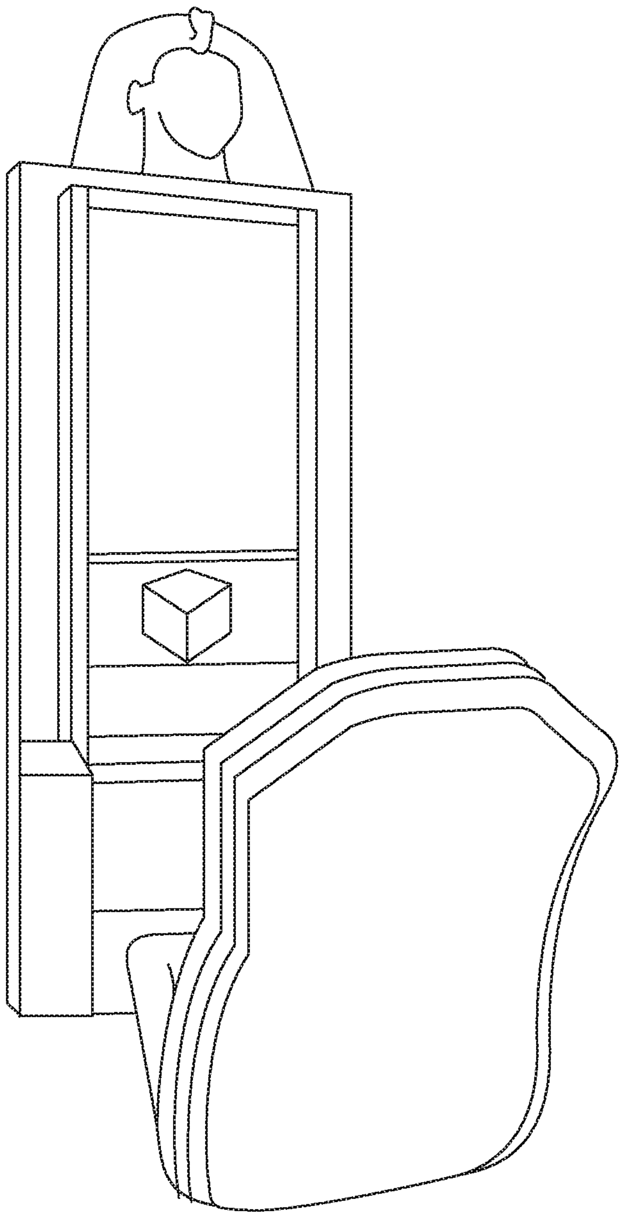
FIG. 7 is a schematic illustrating an electronic gaming machine with a stereoscopic 3D screen where the player can interact with objects displayed on the stereoscopic 3D screen with the player's eye gaze according to some embodiments.

FIG. 7 is a schematic illustrating an electronic gaming machine with a stereoscopic 3D screen where the player can interact with objects displayed on the stereoscopic 3D screen with the player's eye gaze according to some embodiments.

The screen may be utilized, for example, to provide various renderings of 3D interactive games, which may have various 3D and/or overlaid 2D graphical representations that, for example, include various aspects of games as provided by game controller 44. For example, the EGM 10 may be configured to provide a stereoscopic 3D screen where various 3D games can be played, wherein the game object may be a cube (as depicted in FIG. 7), or any other type of shape. The game object may have various surfaces, and in some embodiments, the various surfaces may represent various separate areas which a player may interact with. The game object may be, for example, 3D, and to access other surfaces and/or other sections of the game object, the player and/or the EGM 10 may provide a control signal indicative of a desire and/or a command to rotate, translate (or a combination of the two) such that other gaming surfaces (e.g., surfaces hidden from view and/or positioned obliquely in view) are readily accessible by a player (e.g., a surface is rotated to the forefront of the screen).

Figure 8A:
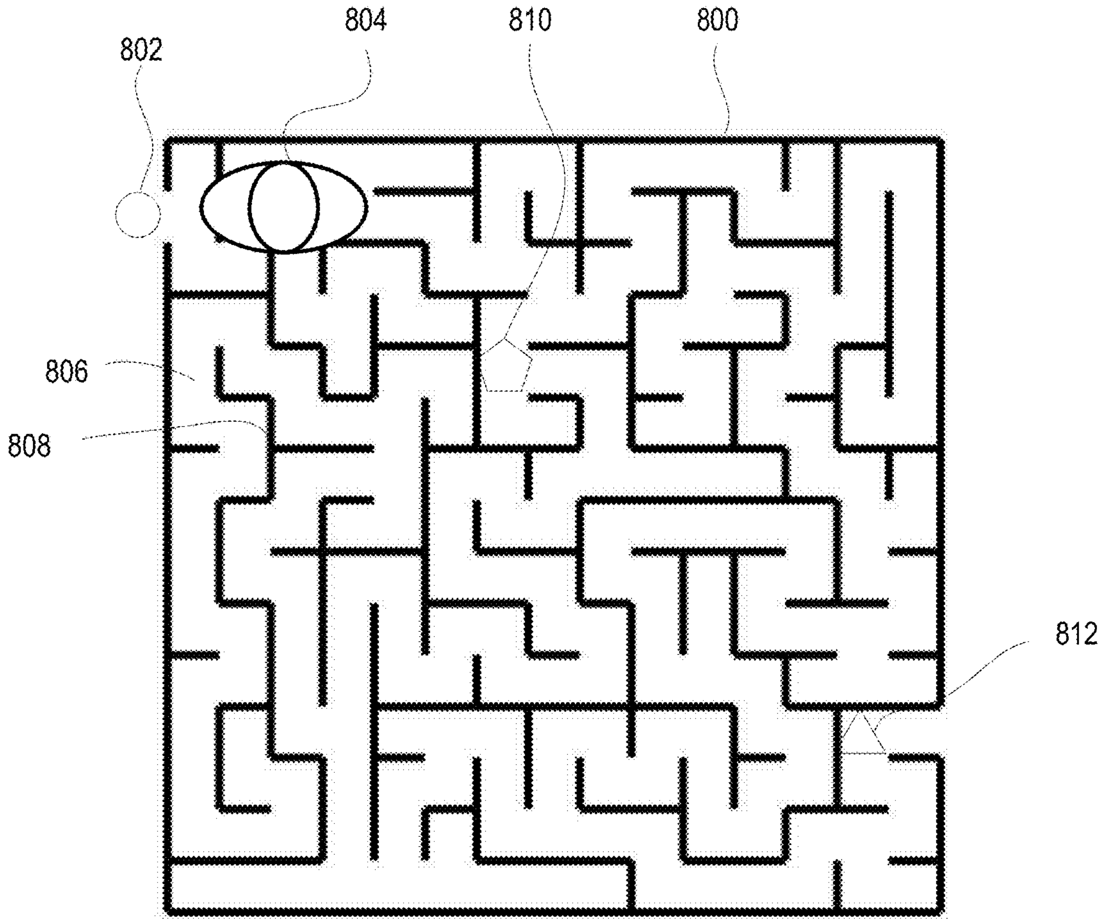
FIGS. 8A, 8B and 9 to 11 are schematic diagrams illustrating some embodiments of interactions between a player's eye gaze and the maze.

FIG. 8A is an example interface screen illustrative of a maze 800 in conjunction with a player's avatar 802, according to some embodiments. The interface screen may be graphically rendered by display controller 52, in conjunction with a game controller board 44.

The maze 800 may include various aspects of an interactive game environment, and may be represented in the form of graphical game components that are rendered on the display 12, 14. The maze 800 may have various electronic "positions" indicative of areas and/or locations within an interactive game environment, such as a 2D or 3D game "world". Maze 800, in some embodiments, may include planar surfaces and/or objects that may also exist in a non-linear and/or an environment only possible in a virtual game environment (e.g., Penfold stairs).

As the game environment is rendered graphically, various elements of data may be stored to track, maintain and/or monitor various interactions and/or graphical components that may exist within the environment of the maze 800, and such elements of data do not necessarily need to correspond with real world physics, rules and/or connections (e.g., one position in the maze may be connected to another through, for example, a graphical portal).

For example, some positions on the maze 800 may be associated with various outcomes, game awards, bonuses, etc., and the positions may be established and/or tracked such that gaming components (e.g., avatars representative of players) are able to traverse the positions within the maze 800.

Such a maze 800 may be provided through display controller 52, on display device 12, 14. All and/or portions of a maze 800 may be depicted graphically, and where a portion of the maze 800 is depicted, the EGM 10 may be configured to track the movement of a player avatar 802 and corresponding "scroll" and/or otherwise adjust the interface provided through display controller 52, on display device 12, 14 to ensure that player avatar 802 is displayed properly on display device 12, 14.

Tracking the eye gaze, eye gesture, and movement of a player may be implemented for a variety of interactive games and graphical animation effects provided by game controller board 44 and display controller 52 in conjunction with a graphics processor 54. The player's gaze may be captured, for example, through at least one data capture camera unit, and converted into inputs for provisioning into player control inputs 50. The player's gaze may be represented as player eye gaze data, and could include various raw data collected in relation to the eye gaze (position, angle, altitude, focus position derived from two eyes operating stereoscopically), and data in relation to captured characteristics of the gaze, such as gaze movement velocity, acceleration, etc. Such information may be tracked, for example, by game controller 44.

For example, the EGM 10 may utilize the game controller 44 to interact with the data capture camera unit to convert the player eye gaze data relative to the display unit to a plurality of points of eye gaze relative to the displayed graphical game components for the interactive network of intercommunicating paths to compute the player pathway. This plurality of points, for example, may be representative of coordinates and a line of sight relative to the display unit.

Coordinates may be represented in various forms in data, for example, in Euclidean coordinates, cylindrical coordinates, spherical coordinates, and/or other forms of coordinate systems. Further, the coordinates (e.g., absolute, relative) may be stored as positional points, angles, elevations, vectors, matrices, arrays, etc., and may further be associated with aspects of metadata related to the stored coordinates, the metadata representative of stored instruction sets that may, for example, indicate the veracity of the measurements (e.g., how reliable), the type of measurement, the device upon which the measurement was recorded, a time-stamp associated with the measurement, etc. Groups of coordinates may be stored in the form of matrices of coordinates, for example.

These coordinates may be captured such that the coordinates may be utilized in downstream processing, such as transformations (e.g., coordinate transformations), rotations, skews. For example, in downstream processing, in the context of a maze 800, the maze 800 may in some embodiments representative of a virtual interactive environment which may not have the same physics and/or relationships between virtual coordinates (e.g., the virtual interactive environment may not necessarily be a flat plane, in Euclidean space). For example, the virtual interactive environment may utilize a maze 800 having surfaces and/or positions configured such that the maze 800 is a virtual surface of a sphere, which may be manifold and/or space upon which is traversed differently than a virtual flat planar surface.

A line of sight may be stored, as described above, as a directional vector relative to the display 12, 14, and/or a reference point on or around EGM 10 (e.g., a position on the EGM 10 itself, a distance marker, a top point of the EGM 10, a point on displays 12, 14). In some embodiments, the game controller 44 is adapted to receive eye gaze positional data relative to two eyes, and to transform the eye gaze positional data to establish an aggregate line of sight based on both eyes. In some embodiments, separate lines of sight may be established for each eye, and a third line of sight may be determined for an aggregate. Such an embodiment may be useful for interactive games having a virtual interactive environment having more than two dimensions. The line of sight data may include associated metadata indicative of a veracity of data, etc.

In the context of an interactive game environment having maze 800, the eye gaze data may be converted to a plurality of points of eye gaze relative to the displayed graphical game components, and such conversion may include determining at a corresponding virtual set of coordinates for use within the interactive game environment. The virtual set of coordinates may require various transformations, and the virtual set of coordinates may be in relation to a two dimensional virtual coordinate, a three dimensional virtual coordinate, and may be on a different type of coordinate system than a Euclidean coordinate system.

Mapping from a Euclidean coordinate system to another type of coordinate system may require the game controller 44 to develop one or more non-linear mappings upon which a transformation may be performed, including, for example, the determination of a Jacobian determinant and/or a matrix including Jacobian determinants for use in the transformation. Where the corresponding virtual set of coordinates for use within the interactive game environment is a three dimensional virtual coordinate including left eye coordinates and right eye coordinates; and the game controller 44 may be configured to transform the left eye coordinates, the right eye coordinates, and the line of sight to determine the three dimensional virtual coordinate. For example, the left eye coordinates, the right eye coordinates, and the line of sight may be utilized together to derive a linearly independent set of base coordinates that are mapped into the interactive gaming environment, based on a virtual coordinate system set out in the interactive gaming environment. The left eye coordinates and the right eye coordinates may be utilized together to determine the line of sight, in some embodiments, based on a stereoscopic calculation based on the two coordinates (e.g., determining a parallax that is defined as the difference between the left and right eye coordinates).

The mapping of virtual coordinates may, for example, be within the maze 800, and represent virtual spaces 806 within the maze 800 (e.g., spaces within the interactive network of intercommunicating paths upon which electronic player token is able to traverse), or walls 808. The game controller 44 may continuously compute the player pathway based on a tracked changes to at least one of (i) the coordinates and (ii) the line of sight relative to the display unit, in relation to the displayed graphical game components for the interactive network of intercommunicating paths during a duration of time (e.g., a pathway duration, which, for example, may be a pre-defined variable and/or a triggered variable).

For example, the duration of time may have a start time and an end time, and the start time may be initiated by identifying that the collected player eye gaze correspond to a location on the display unit upon which the graphical animation for the electronic player token is being displayed, and the end time may be determined by the data capture camera unit identifying a pre-determined gesture of the player (e.g., a wink, an eye close, an eyebrow movement, a blink, a set of blinks, a looking away from the display unit).

As indicated in FIG. 8A, a maze 800 is provided by the interface. The maze 800 may have one or more interconnecting paths as indicated as the spaces 806 between the walls 808 of the maze 800, and the player may, in some embodiments, traverse the maze 800 by controlling the movement of the avatar 802 through the maze 800, for example, by providing gaze inputs through control inputs 50. Each space 806 and/or wall 808 may be represented as a virtual position and associated with various characteristics, such as being associated with triggers, awards, bonuses, dis-bonuses, etc. The positions may be associated with various interactive game components, such as levers, stairs, buttons, etc., which when interacted with, may cause various in-game effects, such as game animations, etc. to occur. In some embodiments, a maze 800 may have one or more spaces 806 that may be operatively associated with one or more start positions, and/or end positions (e.g., when a player avatar 802 traverses from a start position to an end position, a game condition may be satisfied. Multiple start and end positions may be generated, for example, where maze 800 is large, multidimensional, made of sub mazes, configured for operation with multiple players (each being associated with their own avatar 802), etc.

There may be other types of inputs 50, such as winks, blinks, open, close, etc., that may be utilized in conjunction with the EGM 10 in addition to and/or in various combinations with gaze information. For example, in some embodiments, a player may indicate the start and/or end of a gaze pathway through an eye gesture, such as winks, blinks, open, close, etc. The player's eye gaze inputs may be utilized, extracted, processed, transformed, etc., to determine one or more gaze pathways. A player's gaze is tracked by the data capture camera device and the position of the gaze is denoted by the eye symbol 804.

One or more gaze pathways may be mapped from the eye gaze data, and these gaze pathways may be indicative of where the player desires to interact with an object, such as the avatar 802, or an incentive 810, 812, or various interactable graphical components of a maze 800 (e.g., a treasure chest, a wheel, a ladder, a hidden doorway, a button, a pulley; which may, for example, be interacted with to cause various effects to occur). The mapping may be based on an electronically determined and/or estimated position that the player may be indicated to be gazing towards.

Gaze pathways may be mapped based on a start and an end gaze position 804 tracked for a duration of time, etc. Gaze pathways may be stored on EGM 10 as game data, and the game data may be utilized to, in addition to traversing "positions" rendered by graphics processor 54 in relation to the displayed maze 800, for interactions with various elements and/or aspects of an interactive game. In some embodiments, the interactions with various elements and/or aspects of an interactive game may cause modifications to the maze 800, such as the movement of a wall 808, the changing of a space 806, the rotation of the maze 800, the transformation of the maze 800 (e.g., a skewing), a modification of a position of the avatar 802 in the maze 800, etc.

The maze 800 may also have various bonuses and/or incentives available, denoted by the pentagon 810 and triangle 812. These bonuses and/or incentives may be associated, for example, with positions within maze 800, which, for example, if the game controller board 44 determines that a player's avatar 802 has come into proximity (e.g., within a positional threshold in the context of positions within an interactive game environment) with and/or "retrieved" in the contexts of a game being played, may trigger various events and/or conditions to occur. Awards may be triggered by various determinations made by game controller 44 in relation to the gaze pathways stored as game data and/or eye gaze data.

For example, the retrieval of bonuses and/or incentives could cause a timer (e.g., tracked by game controller 44) to permit further eligible time to play the game, the payment of a credit out of hopper 32, various activities associated with wagering (e.g., increasing, reducing a bet, cashing out a bet, placing a bet), among other effects. In some embodiments, the retrieval of bonuses and/or incentives 810, 812 may be a required step in relation to the successful traversal of maze 800. In some embodiments, the retrieval of bonuses and/or incentives may be optional (e.g., providing points, awards, credits). Wager may also be provided in relation to the fulfilment (e.g., satisfaction, failure) of various game conditions. A wager may be input through keypad 36 and displayed on display 38. For example, upon determining that a game condition is met/not met, a wager may be paid out to the player, another player, or another person (e.g., a non-player could also place a wager on a player's progress). An amount of coins and/or tokens may be provided out of hopper 32, screens may flash and/or otherwise indicate a winning wager on display 12, 14, etc.

The interconnecting paths 806 provided are shown as examples. Other types of interconnections are possible and may be contemplated, for example, paths 806 that may, on a three dimensional embodiment of a maze 800, be able to connect through the maze 800 to another location (e.g., on another face of the maze 800). The display 12, 14, may be configured to provide a stereoscopic view of a three dimensional object, and the maze 800 may be graphically rendered such that one or more planar surfaces of the maze 800 are exposed at a given time. In some embodiments, these surfaces may be indicative of different mazes 800.

Accordingly, game controller 44 may be configured to monitor and/or track the virtual positioning of avatar 802 and determine when the avatar has traversed to a section of maze 800 that is operatively connected to another section of maze 800, and for example, such effect may be caused by the triggering of a game condition.

Figure 8B:
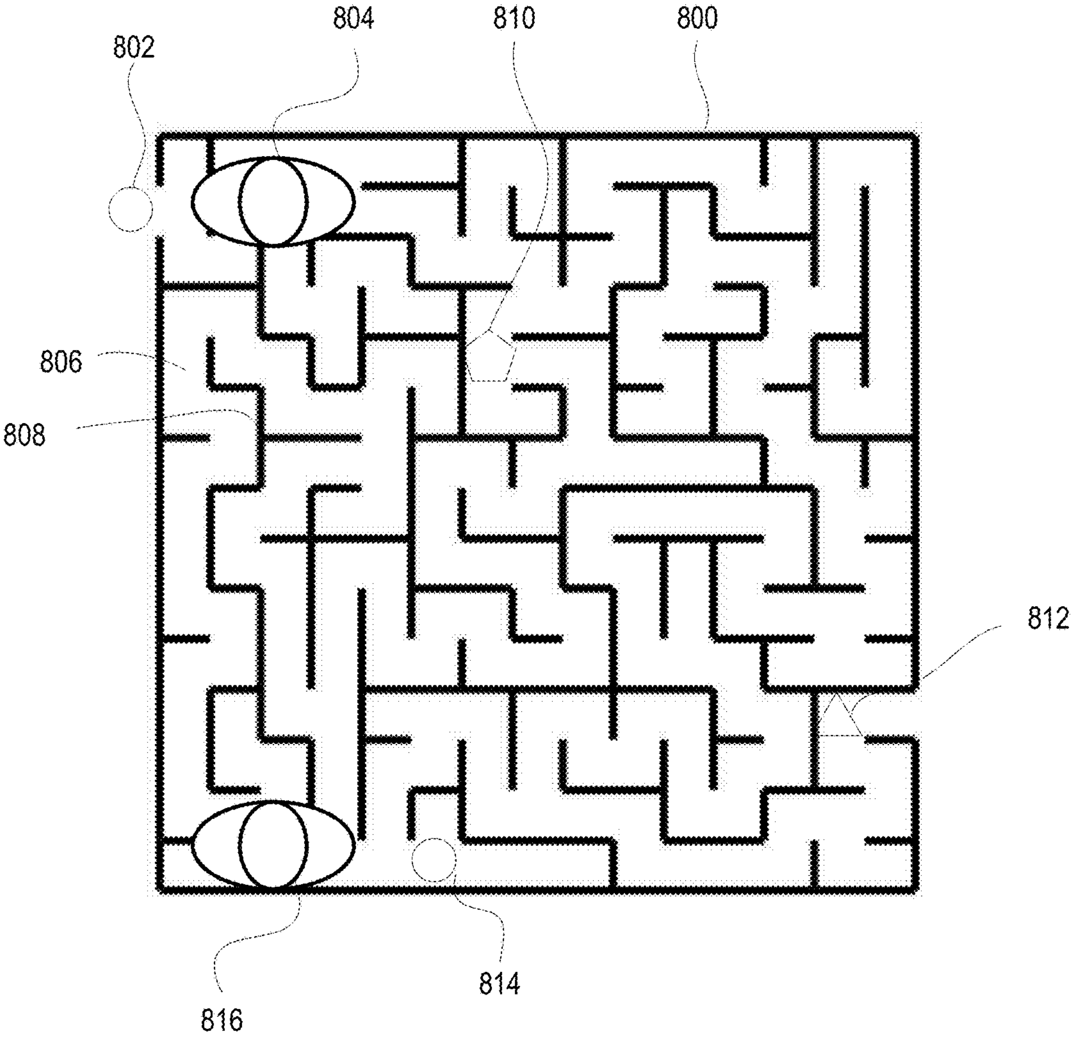

FIG. 8B is a second example maze 800 provided by the interface. In FIG. 8B, an embodiment is depicted where there may be more than one player. For example, there may be a first player and a second player.

The players may be remote from one another, and may be connected operatively through a network 37, and/or connected through a game server 40. In some embodiments, a maze 800 is shared across the network 37 such that EGM 10s may be graphically rendering an interactive game environment wherein both players are interacting with at a given time.

In some embodiments, the players may be playing on the same EGM 10, on which data capture unit may capture the eye gaze data of both the first player and the second player. The second player's eye gaze data may also be collected by the data capture camera unit, and the game controller 44 may be further configured for detecting a plurality of points of eye gaze 816 of the second player relative to the displayed graphical game components for the maze using the collected player gaze data.

Similar to the first player, the game controller 44 may continuously and/or periodically compute and/or graphically render a second player pathway based on the plurality of points of eye gaze 816 of the second player and generate a graphical animation for a second electronic player token (e.g., the second player's avatar 814). The movement of the second player's avatar 814 may, for example, be provided relative to the graphical game components for the maze based on second player's eye gaze data. The movement of the first player's avatar 802 and the second player's avatar 814 may also be utilized in the determination of whether the game conditions have been satisfied, and further, the game conditions may also include conditions that take into consideration the positions of both the first player's avatar 802 and the second player's avatar 814, and/or movements thereof.

For example, a game condition may provide for the awarding of points based on the movement of the first player's avatar 802 following closely to that of the second player's avatar 814 (e.g., the ability to follow the avatar 814's lead). The game condition may be tracked by game controller 44, which may cause various physical interactions to occur upon events happening in relation to an interactive gaming environment. For example, a wager may be paid out, credits may be awarded, the interactive gaming environment may switch to another play state (e.g., a bonus round), etc.

Similarly, some awards, events, triggers and/or conditions may need both the first player's avatar 802 and the second player's avatar 814 to be at particular positions (e.g., to play cooperatively and/or cooperate to solve a puzzle and/or to satisfy a condition). In some embodiments, awards, events, triggers and/or conditions may be provided to only one of the players (e.g., where the players are playing competitively). An interactive game may, for example, include aspects of both cooperative and competitive play.

In some embodiments, there may be more than two players playing at once. In some embodiments, the players may be playing on separate EGM 10s, which may display the other avatar 814 and communicate information about a shared maze 800 based on information located on each of the EGM 10s, which, for example, may be remote from one another and be configured to communicate over a communication link 37.

The interconnecting paths may represent various locations (e.g., along paths 806) upon which an avatar 802 may traverse, or, more generally, various positions that may be provided by the interface in relation to a game. The interconnecting paths may be arranged as an interactive network such that a player is able to interact with the paths by, for example, moving the player's avatar 802 across positions within the maze 800, denoted by the pathways of the paths. For example, while both players may be interacting with portions of a same game, the players may not necessarily be displayed on the same position on their respective screens, as the mazes displayed to the players may be focused on different portions of a maze 800 (e.g., the maze may, in some embodiments, be a large and complex maze that may require some scrolling, rotation, etc).

The player's avatar 802 may be an electronic indicia (e.g., an electronic player token) that is representative of a position of a character and/or object that is being controlled by the player, through inputs provided by the player (e.g., eye gaze inputs, gestures, predicted and/or actual). The characteristics (e.g., current position, past positions, velocity, abilities) of each avatar 802 may, for example, be tracked by a game controller 44.

The traversal of the various interconnecting paths within the maze 800 may be related to various game conditions, which may, for example, be representative of events that may occur within the game or beyond, such as the provisioning of points, bonuses, and capabilities; triggers for game events (e.g., victory conditions, failure conditions, advancement conditions, revealing and/or concealing of pathways), etc.

The eye gaze of the player, for example, may be provided through a captured plurality of points and adapted as inputs 50, and the EGM 10 may be configured for periodically and/or continuously computing a player pathway based on the plurality of points of eye gaze to generate a graphical animation for the electronic player token relative to the graphical game components for the interactive network of intercommunicating paths.

Figure 9:
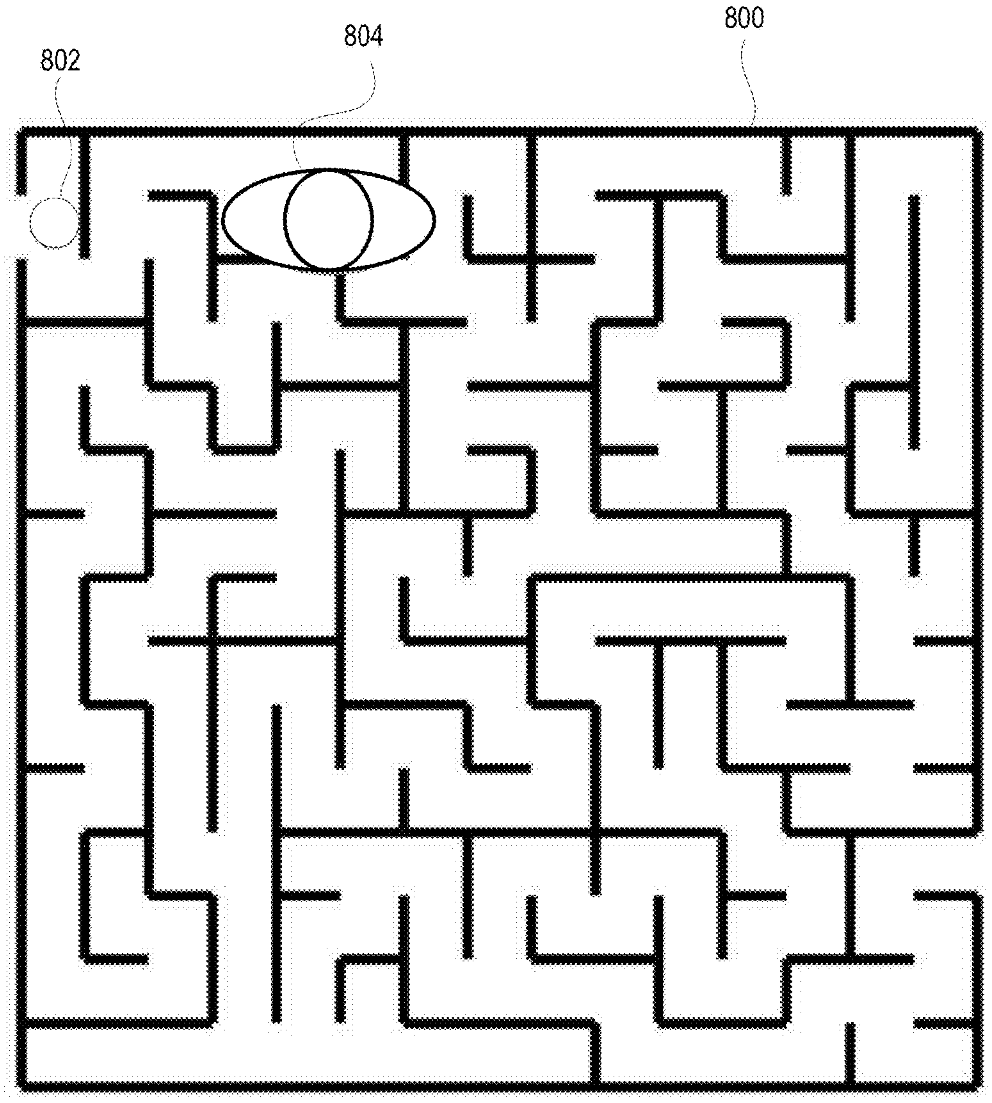

For example, as shown at FIG. 9, the player's gaze position (as provided by the eye symbol 804), has indicated that the player is gazing at a position right of where the player's avatar 802 was residing at FIG. 8A. Accordingly, the EGM 10 may recognize that the player is inputting a command through player control inputs 50, through the player's gaze, to move player's avatar 802 to another position within the maze 800.

The EGM 10 may then cause the movement of the player's avatar 802 to the new position as denoted in FIG. 8A. In some embodiments, a single point of gaze may be utilized in determining that a gaze input was provided. In some embodiments, multiple points of gaze are utilized, and for example, to cause movement of the player avatar 802, a gaze may need to begin at the current position of player avatar 802, and end either indicative in a position towards a direction upon which a player wishes the player avatar 802 to advance towards, or in a position upon which the player wishes the player avatar 802 to advance to. Accordingly, a pathway may be formed by the player's tracked gaze and provided as an input 50.

Various characteristics of the gaze position may indicate varying characteristics of the player's avatar 802's movement. For example, a further gaze position (e.g., further in a direction) may be indicative of a faster (e.g., greater velocity, acceleration) movement to be provided to the player's avatar 802, which could correspondingly move faster on the interactive display provided by the EGM 10. The EGM 10 may, for example, be configured to recognize various eye gestures associated with the tracked eye gaze position information, such as repeated movements, predetermined gestures (e.g., the eye gaze position tracing a circle), among others.

In some embodiments, the EGM 10, through controller 44, validates the movement of the player's avatar 802 in relation to valid and/or invalid positions 806 on the maze 800 (e.g., through the accessing of various business rules and/or logical conditions) to ensure that the player's avatar 802 has actually moved to a valid position within the maze 800. For example, the EGM 10 may be configured to prevent a player's avatar 802 from traversing through a wall of a maze 800, in normal circumstances (e.g., unless, for example, the player's avatar 802 has an ability to pass through walls). The player's avatar 802 may be "stuck" at the wall and unable to traverse further in that direction, despite the player's gaze position indicating a desire to do so.

Figure 10:
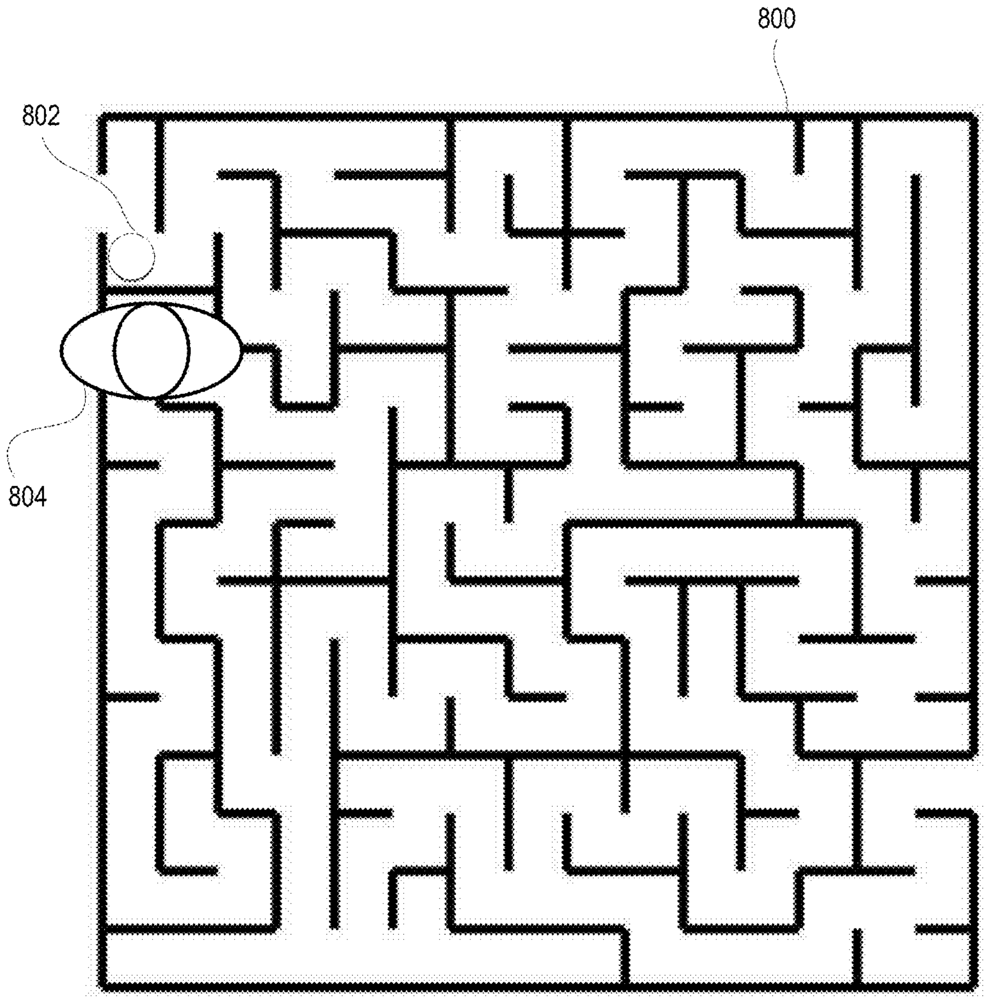

Another sample movement is depicted at FIG. 10, wherein the player's gaze position (as provided by the eye symbol 804), has indicated that the player is gazing at a position below where the player's avatar 802 was located. The EGM 10 recognizes this input and moves the player's avatar 802 accordingly to a valid position within the maze 800 based on the player's gaze position.

The player's gaze position may be tracked such that a particular velocity (or acceleration) is associated with movement of the avatar 802. For example, a player's avatar 802 may track and "move" based on the player's gaze position, but may not do so instantaneously.

Rather, the player's avatar 802 may move at a fixed and/or variable speed in a direction indicated by the player's gaze position (e.g., with the velocity and/or acceleration indicated by the distance and/or other characteristics of the gaze position), and may change direction and/or speed based on the movement of the gaze position of the player. For example, a player's gaze may be detected to change from a upper position relative to the position of the avatar 802 to a position on the right relative to the avatar 802, causing the avatar 802 to turn (e.g., rotate) and/or move (or accelerate) in a direction indicated by the player's gaze.

In another embodiment, a movement may be controlled through the player gazing "at" the position of the player's avatar 802 as depicted on display 12, 14. The player may then gaze "at" another position within maze 800, and if the position is valid (e.g., the position does not require traversing through wall 808, game controller 44 may permit such a move, granted, for example, that such a movement is within a pre-defined range within the interactive gaming environment as defined by a logical rule. While the avatar is moving, in some embodiments, the avatar 802 may not be responsive to gaze inputs until the avatar has completed a move. In other embodiments, the avatar 802 may still be selectable even though the avatar 802 is moving, cancelling a previously entered move and/or pathway when a new movement position is indicated within maze 800, provided that the move is valid. Upon the successful traversal to a position where the player's avatar stops moving, this eye gaze control gesture may be repeated again.

As the player's avatar 802 traverses the maze 800, various in-game conditions may be fulfilled, satisfied, not satisfied, triggered, etc. For example, there may be various awards (e.g., power ups, extra lives, extra capabilities) that may be available within the interactive maze 800, and the player may be able to access these awards through conducting various actions, such as guiding the player's avatar 802 to a particular location (e.g., a location having a power-up or a bonus), to the end of a maze 800 (e.g., an opening may be located at another side of a maze 800, indicative of a victory condition wherein the player has successfully traversed the maze 800). For example, if at least one game condition is satisfied, game controller 44 may provision a suitable award to the player, e.g., a notification may be generated describing and/or indicative of the satisfaction of the game condition and/or a credit may be awarded to the player through hopper 32.

In some embodiments, the interactive maze 800 may be associated with one or more timing conditions. These timing conditions may be tracked by the time elapsed during the traversal of all or a portion of the maze 800, and kept, for example, by a timer, for example, provided by game controller 44. The timer may increase (indicative of total elapsed time) or may decrement (e.g., indicative of how much time remaining) based on a pre-defined time limit. As the player's avatar 802 traverses the maze 800, there may, for example, be various awards wherein the time limit may be extended, etc. Similarly, there may be various pitfalls and/or conditions that cause a time limit to be decreased (e.g., failure to meet a condition or to follow an instruction).

Various notifications, alerts, and/or warnings may be generated based on the time elapsed and/or time remaining.

Figure 11:
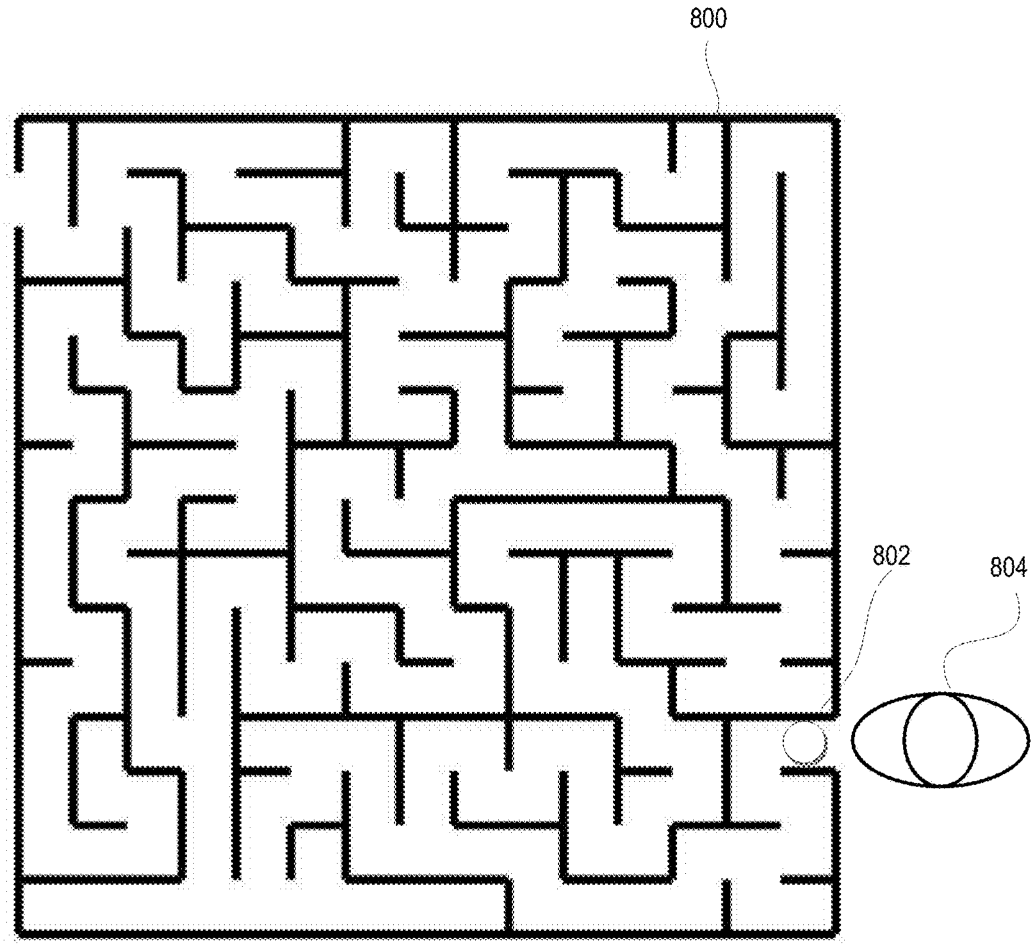

At FIG. 11, a player's avatar 802 is shown wherein the avatar 802 has traversed the maze 800 and the player's avatar 802 is able to exit the maze 800. The maze 800, as indicated, for example, may include at least a virtual end position; and a game condition could include requiring the avatar 802 to be virtually traversed to the virtual end position.

At this point, for example, the player may be notified that the player has successfully met a game condition (e.g., successful traversal of the maze 800), and if the player has traversed the maze 800 before a time limit has elapsed (or below a particular elapsed time), the player may be eligible for an award (e.g., a cash award, a credit award, a virtual credit award).

In an embodiment, the EGM 10 includes a card reader to identify a monetary amount conveyed by a token to the electronic gaming machine, and this monetary amount may be associated with a determination by the game controller 44 of whether the at least one game condition has been satisfied to trigger the card reader to update the monetary amount using the token (e.g., the token may be updated based on a number of the at least one game condition that have been satisfied, and updating the monetary amount may include incrementing/decrementing the monetary amount on the token and/or on a card).

FIGS. 12-15 are indicative of potential variations of the maze 1200 as provisioned on the interactive display, in accordance with some embodiments. As depicted in FIGS. 12-15, there may be a "fog of war" 1206 that may conceal various pathways from the player, as depicted by the solid areas of the figures. The "fog of war" 1206, for example, may be provided as a concealment layer that is created through concealment of all or a portion of the maze 1200 through various techniques, such as a adding solid covering, adding a shaded covering, distorting, adding hash lines, blurring, pixelization, mosaicking, scrambling, turning translucent, increasing opacity, and/or a combination thereof. For example, while solid areas are shown, there may be other types of obfuscation that may be utilized, such as greying out (e.g., the de-saturation of colors), scrambling (e.g., applying a mosaic), among others.

As the player's avatar 1202 traverses the maze 1200, further positions of the maze 1200 may be "revealed", and such revealing may include, for example, rendering visible, uncovering, unscrambling, un-blurring, saturating with color, etc., by graphics processor 54 and/or display controller 52 Accordingly, the game controller 44 may keep track of the position of player avatar 1202, and for example, uncover a radius around player avatar 1202. In some embodiments, the gaze position and/or a plurality of gaze positions, may be utilized in determining what areas of the concealment layer 1206 to reveal in relation to the graphical depiction rendered on displays 12, 14. The revealing may include, for example, a gradual and/or a sudden uncovering of concealment layer 1206. In some embodiments, there may be different layers of concealment layer 1206, for which the revealing may be controlled by game controller 44 through tracked game data. For example, concealment layer 1206 may include various aspects of metadata, flags, and/or variables associated with positions mapped within an interactive gaming environment.

Figure 12:
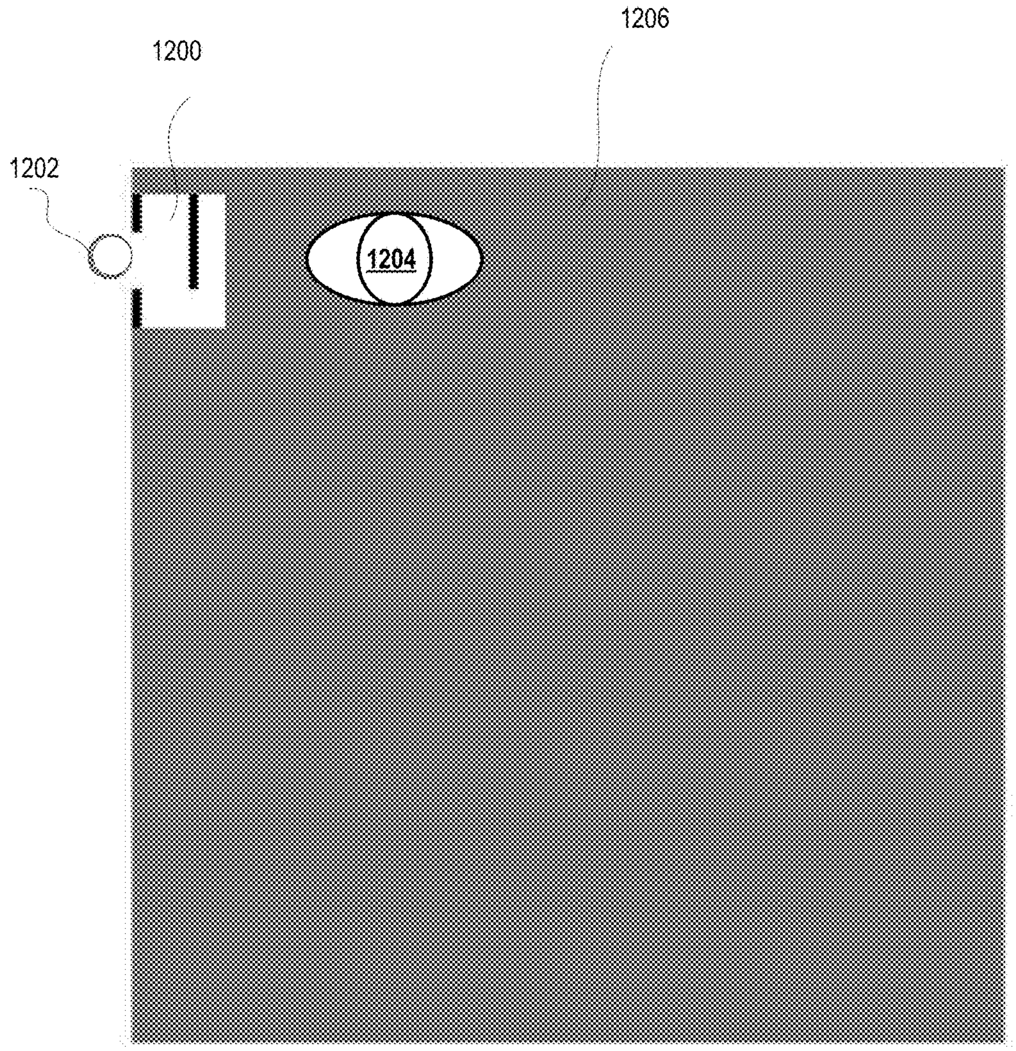
FIGS. 12 to 15 are schematic diagrams illustrating some embodiments of interactions between a player's eye gaze and the maze having a concealment layer associated with the maze that is selectively revealed.

At FIG. 12 a player's avatar 1202 is depicted at a position at the start of the maze 1200. As shown in FIG. 12, the maze 1200 is concealed aside from the area in near proximity to the player's avatar 1202. The concealment layer 1206, for example, may represent a "fog of war" that covers the maze 1200 which prevents the user from seeing the entire maze 1200.

Figure 13:
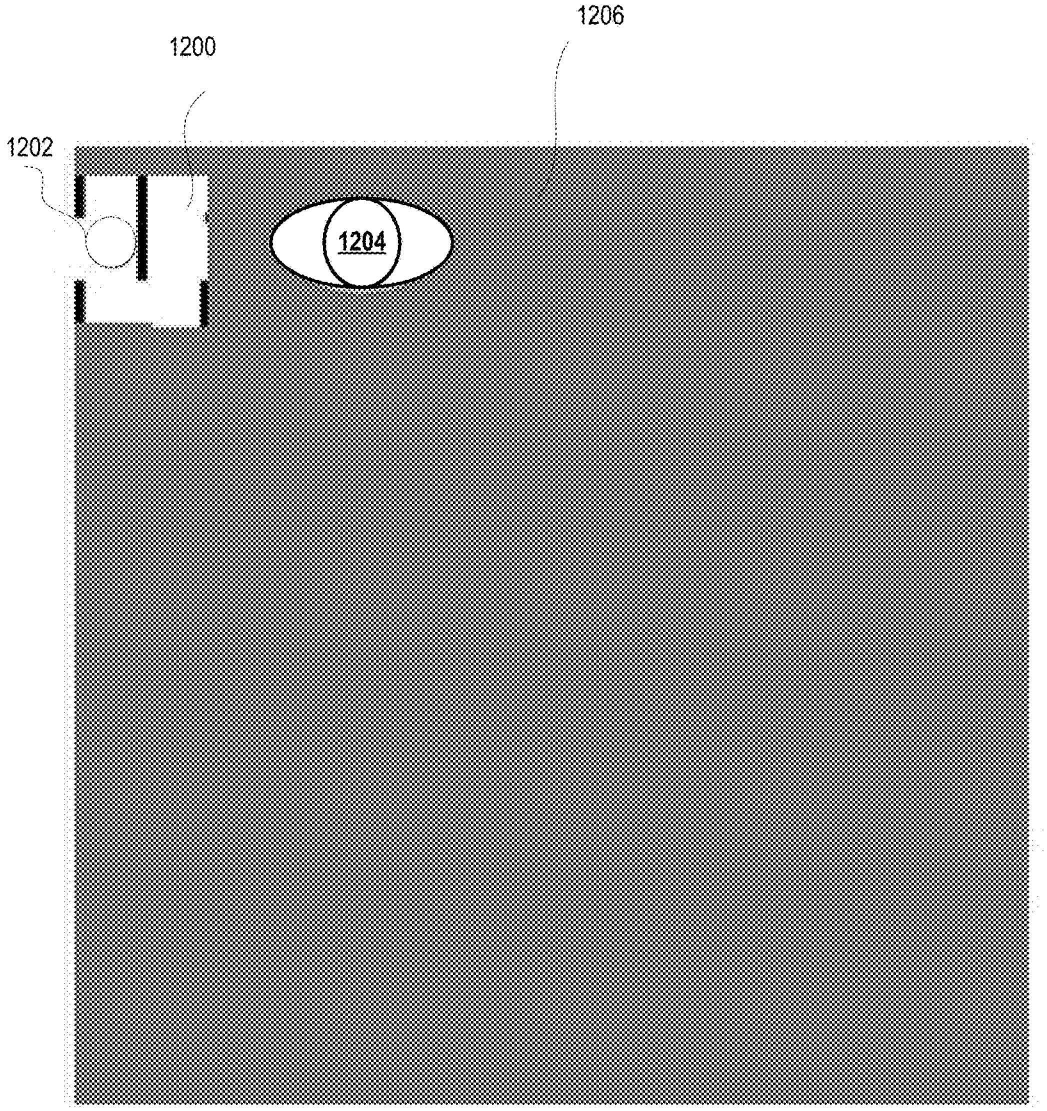

The player's gaze is denoted with the eye symbol 1204 and, for example, a player may utilize the player's gaze to input a command to the player's avatar 1202 to indicate a movement forward. FIG. 13 illustrates that the player's avatar 1202 has moved forward, traversing part of the maze 1200, travelling along a pathway of the maze 1200. As indicated in FIG. 13, more of the maze 1200 may be revealed to the player, for example, through permanent and/or temporary withdrawal of the concealment layer 1206.

Figure 14:
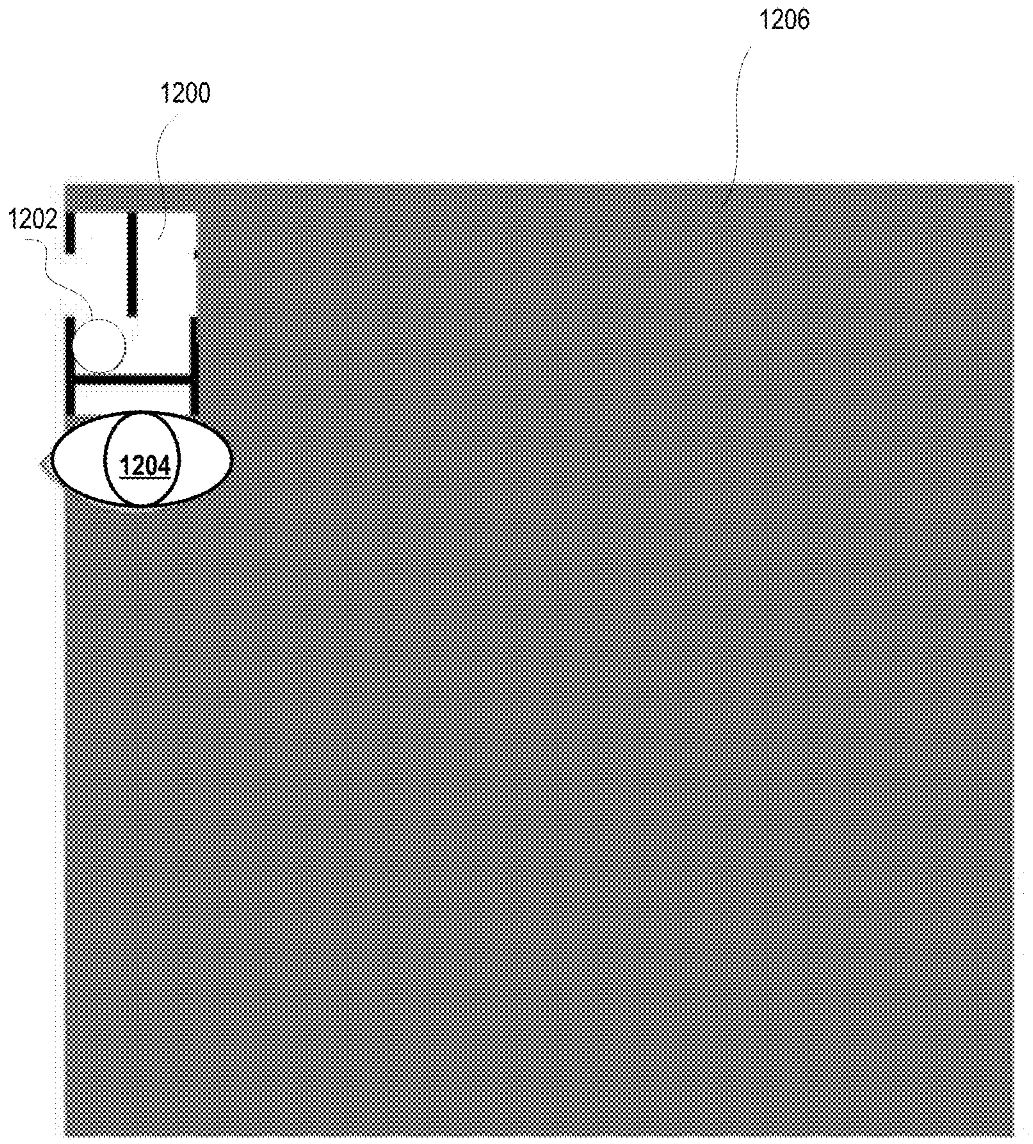

FIG. 14 is an illustration wherein the player's avatar 1202 has been guided to move towards a lower wall of the maze 1200. As indicated, further portions of the maze 1200 may be uncovered in response to the movements of the player's avatar 1202. Other conditions may also be considered for selectively revealing and/or concealing portions of the maze 1200, such as selectively revealing and/or concealing portions of the maze 1200 based on satisfaction of various conditions, based on awards that are provisioned to the player (e.g., for successfully completing an action, the entire maze 1200 or a larger portion thereof may be revealed), the payment of further credits by the player, the reduction of a difficulty level, etc.

Figure 15:
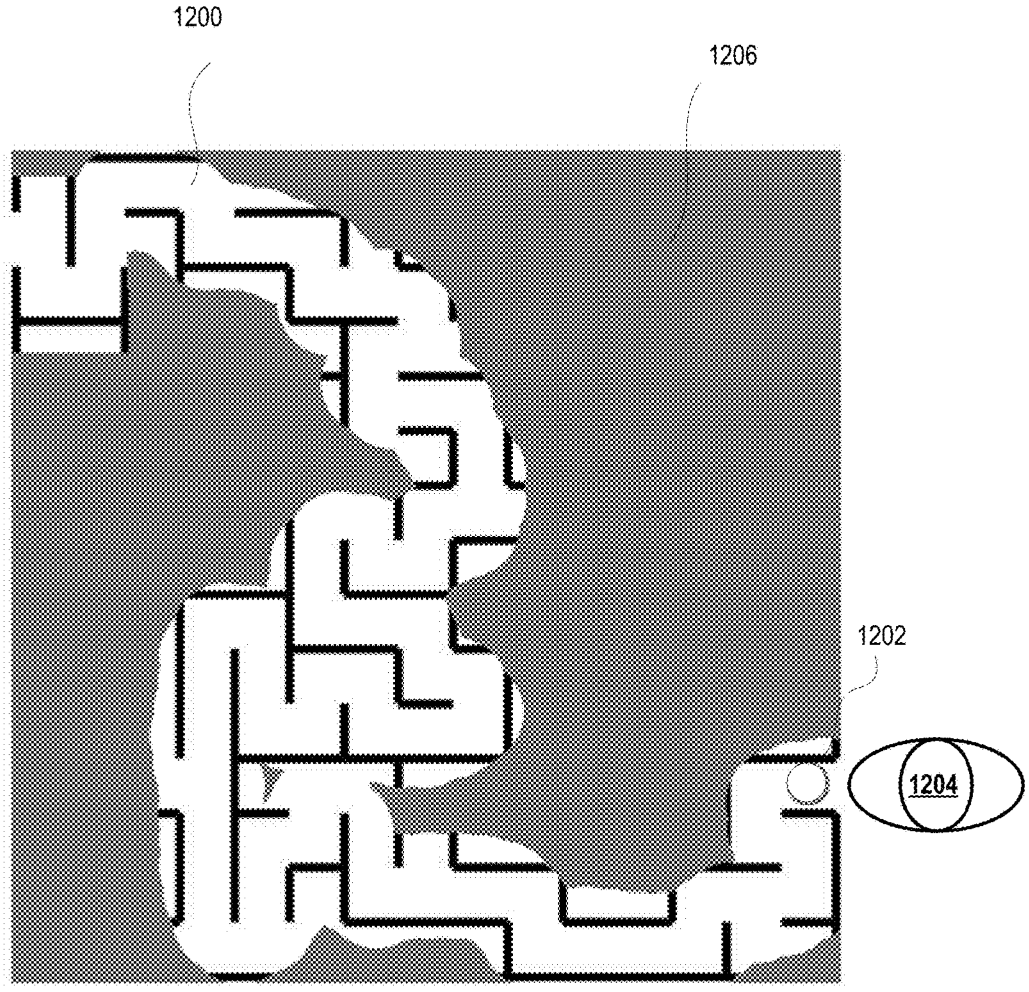

FIG. 15 is illustrative of a player's avatar 1202 successfully traversing a maze 1200, and as shown in FIG. 15, the concealment layer 1206 was selectively revealed during the traversal of the maze 1200. The concealment layer 1206, in some embodiments, may be revealed in accordance with a pathway taken by a player's avatar 1202 in traversing the maze 1200. In some embodiments, previously revealed positions on the maze 1200 may be covered (e.g., after a period of time has elapsed) based on various triggers and/or conditions. Upon successful traversal of the maze 1200, in some embodiments, the entire concealment layer 1206 may be removed.

Figure 16:
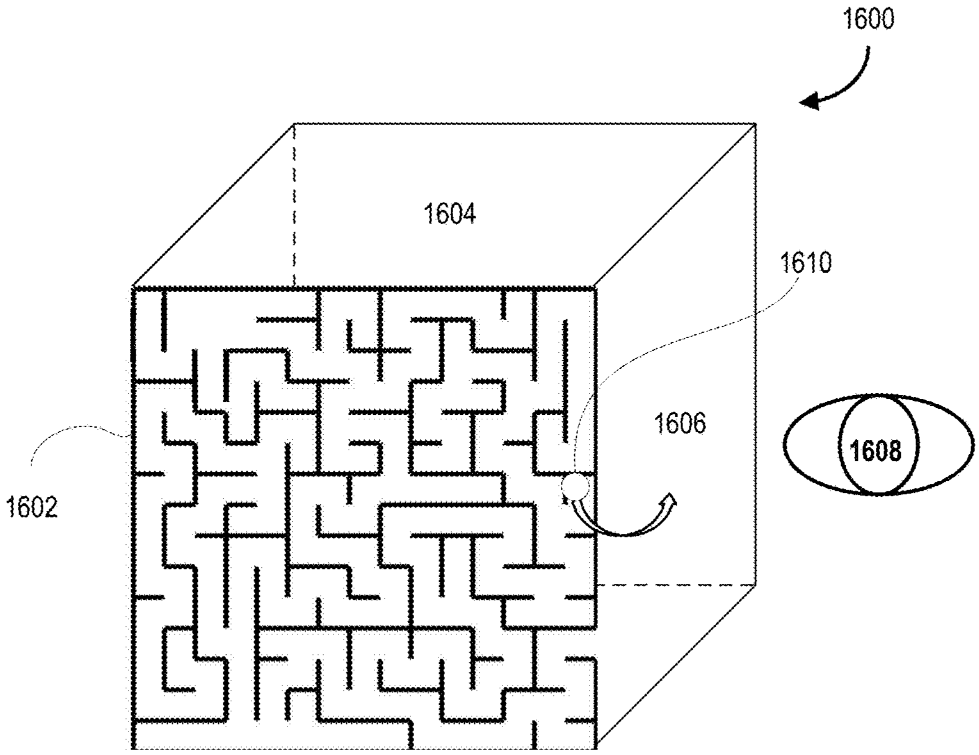
FIG. 16 is a schematic diagram illustrating a three-dimensional maze, according to some embodiments, where the maze is navigable from one plane to another plane in response to tracked player gaze position data.

FIG. 16 is a perspective view of a multi-dimensional maze 1600, according to some embodiments. While other shapes may be considered (e.g., there may be more complicated shapes, such as tunnels, non-regular 3D objects, impossible 3D objects (e.g., objects that may not be able to exist in reality but may, for example, exist in a virtual sense where various physical rules may be contradicted and/or broken)). The game controller 44 may assign various virtual positions to surfaces and/or planes of maze 1600 such that graphics processor 54 and display controller 52 are able to render corresponding graphical images of various gaming components and/or aspects of maze 1600 (e.g., exposed surfaces relative to a "viewing perspective" of a player).

The multi-dimensional maze 1600 of FIG. 16, depicted as a 3D cube, may be traversed in various ways by player avatar 1610. For example, the multi-dimensional maze 1600 may include, for example, a series of multiple mazes that may exist on separate planes 1604, 1606 of a 3D object (e.g., an example being a cube with 6 sides, planes 1604 and 1606 are shown in FIG. 16). A larger number of dimensions and/or planes are possible.

Each separate maze, for example, may be coupled and/or connected to each other with open edges of the mazes. Where the player's avatar 1610 and/or gaze position 1608 indicates that a player's avatar 1610 is nearing the edge of a maze having, for example, an opening, the avatar 1610 may be able to "follow" the gaze off the edge and the geometric shape will rotate along the opposite axis the avatar is traveling.

The "following" may be represented by detected gaze inputs 50 that may, for example, be interpreted by game controller 44 to require captured actions such as a prolonged gaze at a particular position, a gaze off the "edge" of the maze, a gaze having a requisite velocity and/or acceleration towards the "edge", a gaze having a starting position and/or a trajectory indicative of a "directional rotation" of the maze 1600, etc.

During the rotation, in some embodiments, the maze 1600 may not be responsive to player inputs. Once the maze has finished rotating within the display, the player's avatar 1610 may be adapted to follow the player's gaze 1608 again. For example, player inputs 50 in relation to the movement of the player's avatar 1610 may be disabled during a rotation.

In some embodiments, the player may be required to satisfy some condition (e.g., hold their gaze 1608 at the edge for a specified amount of time) before the avatar 1602 will move to the other maze. There may be corresponding points between the mazes different planes (e.g., on 1602, 1604, and 1606) that indicate where a player's avatar 1602 will end up when the maze 1600 rotates.

General

The embodiments of the devices, systems and methods described herein may be implemented in a combination of both hardware and software. These embodiments may be implemented on programmable computers, each computer including at least one processor, a data storage system (including volatile memory or non-volatile memory or other data storage elements or a combination thereof), and at least one communication interface.

Program code is applied to input data to perform the functions described herein and to generate output information. The output information is applied to one or more output devices. In some embodiments, the communication interface may be a network communication interface. In embodiments in which elements may be combined, the communication interface may be a software communication interface, such as those for inter-process communication. In still other embodiments, there may be a combination of communication interfaces implemented as hardware, software, and combination thereof.

Throughout the following discussion, numerous references will be made regarding servers, services, interfaces, portals, platforms, or other systems formed from computing devices. It should be appreciated that the use of such terms is deemed to represent one or more computing devices having at least one processor configured to execute software instructions stored on a computer readable tangible, non-transitory medium. For example, a server can include one or more computers operating as a web server, database server, or other type of computer server in a manner to fulfill described roles, responsibilities, or functions. The devices provide improved computer solutions for hardware limitations such as display screen, display device, and so on.

The following discussion provides many example embodiments. Although each embodiment represents a single combination of inventive elements, other examples may include all possible combinations of the disclosed elements. Thus if one embodiment comprises elements A, B, and C, and a second embodiment comprises elements B and D, other remaining combinations of A, B, C, or D, may also be used.

The term "connected" or "coupled to" may include both direct coupling (in which two elements that are coupled to each other contact each other) and indirect coupling (in which at least one additional element is located between the two elements).

Embodiments described herein may be implemented by using hardware only or by using software and a necessary universal hardware platform. Based on such understandings, the technical solution of embodiments may be in the form of a software product. The software product may be stored in a non-volatile or non-transitory storage medium, which can be a compact disk read-only memory (CD-ROM), USB flash disk, or a removable hard disk. The software product includes a number of instructions that enable a computer device (personal computer, server, or network device) to execute the methods provided by the embodiments.

The embodiments described herein are implemented by physical computer hardware. The embodiments described herein provide useful physical machines and particularly configured computer hardware arrangements. The embodiments described herein are directed to electronic machines methods implemented by electronic machines adapted for processing and transforming electromagnetic signals which represent various types of information. The embodiments described herein pervasively and integrally relate to machines, and their uses; and the embodiments described herein have no meaning or practical applicability outside their use with computer hardware, machines, a various hardware components. Substituting the computing devices, servers, receivers, transmitters, processors, memory, display, networks particularly configured to implement various acts for non-physical hardware, using mental steps for example, may substantially affect the way the embodiments work. Such computer hardware limitations are clearly essential elements of the embodiments described herein, and they cannot be omitted or substituted for mental means without having a material effect on the operation and structure of the embodiments described herein. The computer hardware is essential to the embodiments described herein and is not merely used to perform steps expeditiously and in an efficient manner.

For example, and without limitation, the computing device may be a server, network appliance, set-top box, embedded device, computer expansion module, personal computer, laptop, personal data assistant, cellular telephone, smartphone device, UMPC tablets, video display terminal, gaming console, electronic reading device, and wireless hypermedia device or any other computing device capable of being configured to carry out the methods described herein.

Although the embodiments have been described in detail, it should be understood that various changes, substitutions and alterations can be made herein without departing from the scope as defined by the appended claims.

Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed, that perform substantially the same function or achieve substantially the same result as the corresponding embodiments described herein may be utilized. Accordingly, the appended claims are intended to include within their scope such processes, machines, manufacture, compositions of matter, means, methods, or steps.

As can be understood, the examples described above and illustrated are intended to be exemplary only.

What is claimed is:

1. An electronic gaming machine comprising:

at least one data storage unit to store game data for a game, the game data comprising at least one game condition and an interactive network of intercommunicating paths, the at least one game condition being associated with traversal of the interactive network of intercommunicating paths;

a graphics processor to generate an interactive game environment, wherein the interactive game environment provides graphical game components for the interactive network of intercommunicating paths and an electronic player token;

a display unit to display, via a graphical user interface, the graphical game components in accordance with the game data to graphically display the interactive network of intercommunicating paths;

a data capture camera unit to continuously collect player eye gaze data relative to the display unit;

a game controller for detecting, using the collected player eye gaze data, a plurality of points of eye gaze relative to the displayed graphical game components for the interactive network of intercommunicating paths; and continuously computing a player pathway based on the plurality of points of eye gaze to generate a graphical animation representative of movement of the electronic player token relative to the graphical game components for the interactive network of intercommunicating paths; and a display controller to control the display unit, via the graphical user interface, to trigger the graphical animation for the electronic player token representative of movement of the electronic player token as a mapping of the player pathway to the interactive network of intercommunicating paths, and to determine whether the at least one game condition has been satisfied to trigger a notification message or transfer of an award to a token.

2. The electronic gaming machine of claim 1, wherein the player pathway is computed based at least on a plurality of predicted points of eye gaze.

3. The electronic gaming machine of claim 2, wherein the plurality of predicted points of eye gaze are predicted through using at least prior player data of one or more other players or historical data for the player.

4. The electronic gaming machine of claim 1, wherein the interactive network of intercommunicating paths includes one or more award positions, which when traversed upon by the electronic player token, causes provisioning of one or more awards via the token and a card reader that cause at least one of the at least one game condition to be satisfied.

5. The electronic gaming machine of claim 1, wherein the graphical game components graphically displaying the interactive network of intercommunicating paths are configured to graphically display a concealment layer, the concealment layer visually concealing on the display unit at least a portion of the interactive network of intercommunicating paths.

6. The electronic gaming machine of claim 5, wherein the concealment layer utilizes at least one of covering, blurring, mosaicking, and pixelization techniques for concealing the at least a portion of the interactive network of intercommunicating paths on the display unit.

7. The electronic gaming machine of claim 5, wherein the concealment layer is graphically removed across one or more graphical areas in response to a position of the electronic player token mapped of the player pathway to the interactive network of intercommunicating paths to reveal at least part of the concealed portion of the interactive network of intercommunicating paths.

8. The electronic gaming machine of claim 5, wherein the concealment layer is graphically removed at positions derived at least from the plurality of points of eye gaze of the player to reveal at least part of the concealed portion of the interactive network of intercommunicating paths.

9. The electronic gaming machine of claim 1, wherein the interactive network of intercommunicating paths is provided as a multi-dimensional maze having one or more interactive planes representative of separate interactive networks of intercommunicating paths, and wherein the electronic player token is adapted for traversing between interactive planes of the one or more interactive planes through one or more linkages established between the one or more interactive planes.

10. The electronic gaming machine of claim 9, wherein the multi-dimensional maze is a three dimensional cube or a three dimensional sphere.

11. The electronic gaming machine of claim 10, wherein the multi-dimensional maze is configured for rotation in response to the electronic player token reaching an edge of one of the one or more interactive planes, and wherein rotation of the multi-dimensional maze causes exposure of at least another interactive plane of the one or more planes.

12. The electronic gaming machine of claim 11, wherein upon rotation of the multi-dimensional maze, the electronic player token is graphically repositioned on at least one of the interactive planes of the one or more planes that is exposed by the rotation of the multi-dimensional maze.

13. The electronic gaming machine of claim 1, wherein the data capture camera unit is configured to collect player eye gaze data of a second player;

wherein the game controller is further configured for detecting a plurality of points of eye gaze of the second player relative to the displayed graphical game components for the interactive network of intercommunicating paths using the collected player eye gaze data; and continuously computing a second player pathway based on the plurality of points of eye gaze of the second player to generate a second graphical animation for a second electronic player token relative to the graphical game components for the interactive network of intercommunicating paths; and wherein the display controller is configured to control the display, via the graphical user interface, to trigger the second graphical animation for the second electronic player token representative of movement of the second electronic player token as a mapping of the second player pathway to the interactive network of intercommunicating paths.

14. The electronic gaming machine of claim 13, wherein the at least one game condition is associated with traversal of the interactive network of intercommunicating paths by both the first electronic player token and the second electronic player token.

15. The electronic gaming machine of claim 13, wherein the at least one game condition includes at least one cooperative game condition requiring satisfaction of the game condition by both the first electronic player token and the second electronic player token.

16. The electronic gaming machine of claim 1, wherein the player pathway is computed based on the plurality of points of eye gaze by determining a start position and an end position for the points of eye gaze across a duration of time, and the game controller determining that the start position is a current position of the electronic player token, and the end position is a valid position within the interactive network of intercommunicating paths in which the electronic player token is capable of moving to.

17. The electronic gaming machine of claim 1, wherein the player pathway is computed based on determining that the plurality of points of eye gaze are indicative of a direction in which the electronic player token is capable of making a valid move within the interactive network of intercommunicating paths, and the player pathway includes establishing, by the game controller, a pathway in which the electronic player token moves in the direction indicated by the plurality of points of eye gaze.

18. The electronic gaming machine of claim 1, wherein the game controller interacts with the data capture camera unit to convert the player eye gaze data relative to the display unit to the plurality of points of eye gaze relative to the displayed graphical game components for the interactive network of intercommunicating paths to compute the player pathway.

19. An electronic gaming machine comprising:

at least one data storage unit to store game data for a game, the game data comprising at least one game condition and an interactive network of intercommunicating paths, the at least one game condition being associated with traversal of the interactive network of intercommunicating paths;

a graphics processor to generate an interactive game environment, wherein the interactive game environment provides graphical game components for the interactive network of intercommunicating paths and an electronic player token;

a display unit to display, via a graphical user interface, the graphical game components in accordance with the game data to graphically display the interactive network of intercommunicating paths;

a data capture camera unit to continuously collect player eye gaze data defined as coordinates and a line of sight relative to the display unit;

a game controller for converting the collected player eye gaze data relative to the display unit to a plurality of points of eye gaze relative to the displayed graphical game components for the interactive network of intercommunicating paths; and continuously computing a player pathway based on the plurality of points of eye gaze to generate a graphical animation representative of movement of the electronic player token relative to the graphical game components for the interactive network of intercommunicating paths; and a display controller to control the display unit, via the graphical user interface, to trigger the graphical animation for the electronic player token representative of movement of the electronic player token as a mapping of the player pathway to the interactive network of intercommunicating paths, and to determine whether the at least one game condition has been satisfied to trigger transfer of an award to a token via a card reader.

20. An electronic gaming machine comprising:

a card reader to identify a monetary amount conveyed by a token to the electronic gaming machine;

at least one data storage unit to store game data for a game, the game data comprising at least one game condition and an interactive network of intercommunicating paths, the at least one game condition being associated with traversal of the interactive network of intercommunicating paths;

a graphics processor to generate an interactive game environment, wherein the interactive game environment provides graphical game components for the interactive network of intercommunicating paths and an electronic player token;

a display unit to display, via a graphical user interface, the graphical game components in accordance with the game data to graphically display the interactive network of intercommunicating paths;

a data capture camera unit to continuously collect player eye gaze data defined as coordinates and a line of sight relative to the display unit;

a game controller for converting the collected player eye gaze data relative to the display unit to a plurality of points of eye gaze relative to the displayed graphical game components for the interactive network of intercommunicating paths; and continuously computing a player pathway based on the plurality of points of eye gaze to generate a graphical animation representative of movement of the electronic player token relative to the graphical game components for the interactive network of intercommunicating paths;

a display controller to control the display unit, via the graphical user interface, to trigger the graphical animation for the electronic player token representative of movement of the electronic player token as a mapping of the player pathway to the interactive network of intercommunicating paths; and the game controller determines whether the at least one game condition has been satisfied to trigger the card reader to update the monetary amount using the token.

* * * * *